United States Patent
Keady et al.

(10) Patent No.: US 6,576,805 B2
(45) Date of Patent: *Jun. 10, 2003

(54) CAT CRACKER GAS PLANT PROCESS FOR INCREASED OLEFINS RECOVERY

(75) Inventors: Ginger S. Keady, Houston, TX (US); Juan Puerto, Houston, TX (US); Berj Garbouchian, Houston, TX (US)

(73) Assignee: Stone & Webster Process Technology, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/874,172

(22) Filed: Jun. 5, 2001

(65) Prior Publication Data

US 2001/0044565 A1 Nov. 22, 2001

Related U.S. Application Data

(63) Continuation of application No. 09/255,281, filed on Feb. 22, 1999, now Pat. No. 6,271,433.

(51) Int. Cl.[7] ............................ C10G 7/02; B01D 3/10; C07C 7/00
(52) U.S. Cl. ........................ 585/802; 585/803; 585/809; 208/347; 208/351; 208/354
(58) Field of Search ............................. 585/802, 803, 585/809; 208/347, 351, 354

(56) References Cited

U.S. PATENT DOCUMENTS

| 2,469,724 A | 5/1949 | Gross |
| 2,952,983 A | 9/1960 | Gilmore |
| 3,002,358 A | 10/1961 | Dierl |
| 3,238,735 A | 3/1966 | Siewert |
| 3,309,882 A | 3/1967 | Cabanaw |

(List continued on next page.)

FOREIGN PATENT DOCUMENTS

| EP | 0759539 A1 | 2/1997 |
| EP | 0795738 A1 | 9/1997 |
| JP | 10126241 | 5/1998 |
| JP | 10170210 | 6/1998 |

OTHER PUBLICATIONS

Nelson's Petroleum Refinery Engineering (McGraw Hill1949, pp. 759–810).

(List continued on next page.)

*Primary Examiner*—Walter D. Griffin
*Assistant Examiner*—Tam M. Nguyen
(74) *Attorney, Agent, or Firm*—Vinson & Elkins L.L.P.

(57) ABSTRACT

The invention relates to a new process for more efficient separation and recovery of light olefins such as ethylene and propylene from a fluid catalytic cracking unit. The new process invention for recovering olefins from a mixture of cracked hydrocarbons from a fluid catalytic cracker comprises the steps of: (a) providing a mixture of cracked hydrocarbons including methane, ethylene, ethane, propylene, propane, butylene, butane and heavier hydrocarbons such as naphtha produced in a fluid catalytic cracker; (b) separating said mixture into (i) a first stream comprising substantially all of said ethane, ethylene, and methane and a major portion of said propane and propylene and (ii) a second stream comprising a portion of said butylene and butane, and a major portion of said heavier hydrocarbons; and (c) processing said first stream to recover the ethylene and propylene therefrom, and the details of such process described herein.

15 Claims, 8 Drawing Sheets

U.S. PATENT DOCUMENTS

| | | |
|---|---|---|
| 3,607,734 A | 9/1971 | Stafford, Sr. |
| 4,121,517 A | 10/1978 | Dobson |
| 4,479,812 A | 10/1984 | Hsia et al. |
| 4,756,730 A | 7/1988 | Stupin |
| 4,900,347 A | 2/1990 | McCue, Jr. et al. |
| 4,980,053 A | 12/1990 | Li et al. |
| 5,015,364 A | 5/1991 | Harandi |
| 5,090,977 A | 2/1992 | Strack et al. |
| 5,220,097 A | 6/1993 | Lam et al. |
| 5,232,675 A | 8/1993 | Shu et al. |
| 5,253,479 A | 10/1993 | Di Cintio et al. |
| 5,326,465 A | 7/1994 | Yongqing et al. |
| 5,358,918 A | 10/1994 | Yukang et al. |
| 5,380,690 A | 1/1995 | Zhicheng et al. |
| 5,414,170 A | 5/1995 | McCue et al. |
| 5,421,167 A | 6/1995 | Verma |
| 5,502,971 A | 4/1996 | McCarthy et al. |
| 5,546,764 A | 8/1996 | Mehra |
| 5,647,972 A | 7/1997 | Kantorowicz et al. |

OTHER PUBLICATIONS

Meyer's Handbook of Petroleum Refining Process (Second edition 1997, pp. 3.1–3.112).

Petroleum Refinery Distillation by Watkins, Second Edition.

Handbook of Petroleum Refining Process, second edition (1997), edited by Robert A Meyers; published by McGraw–Hill Chapter 3.5 (pp. 3.101–3.112) entitled "Deep Catalytic Cracking, the New Lights Olefin Generator".

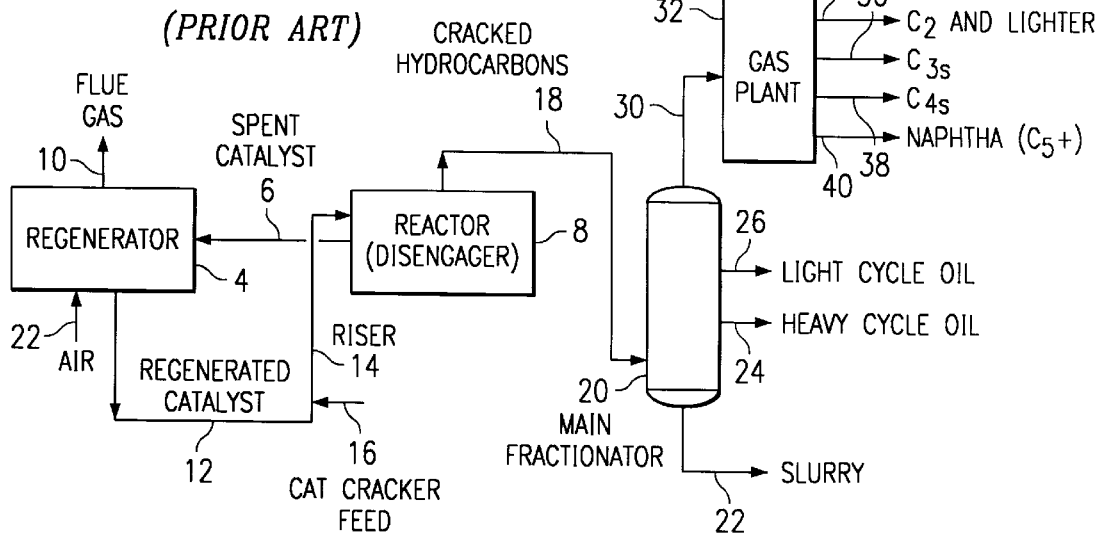
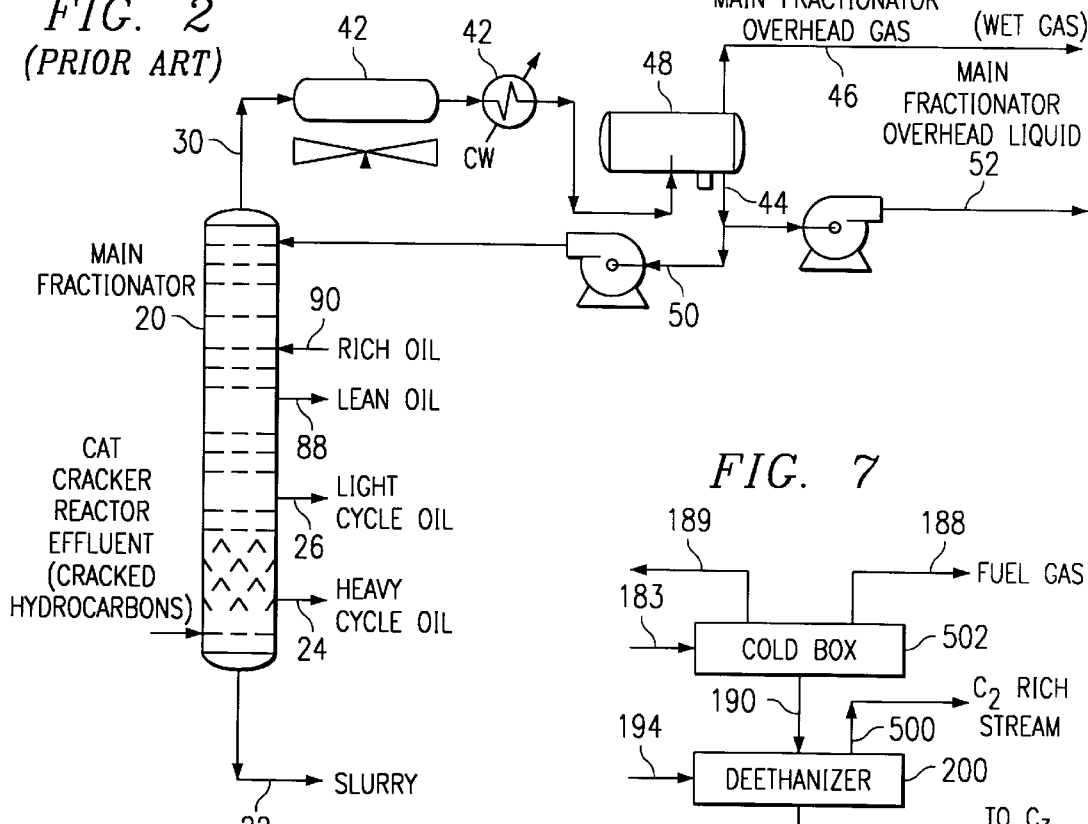
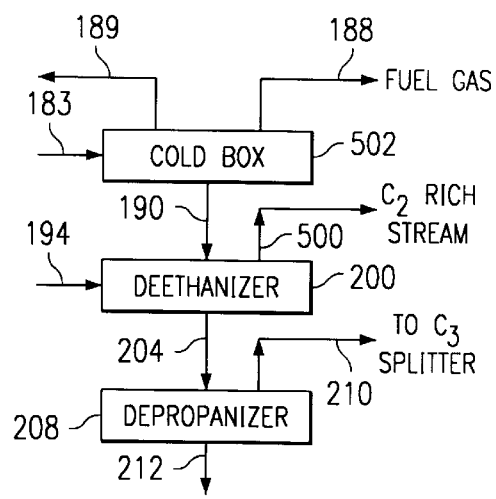

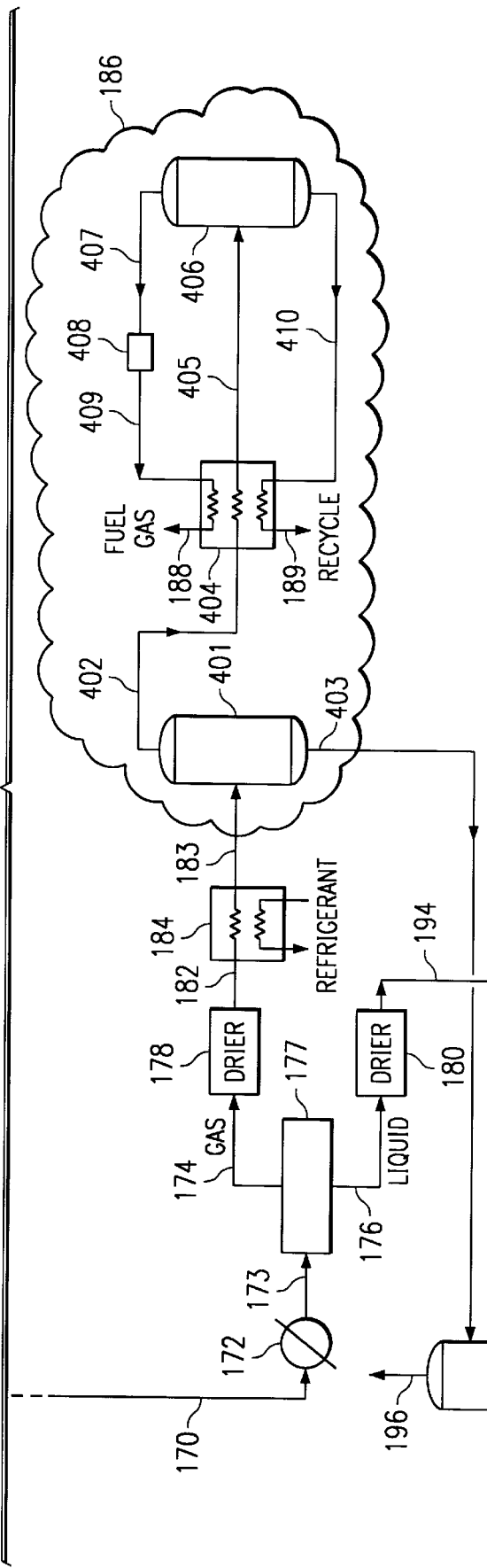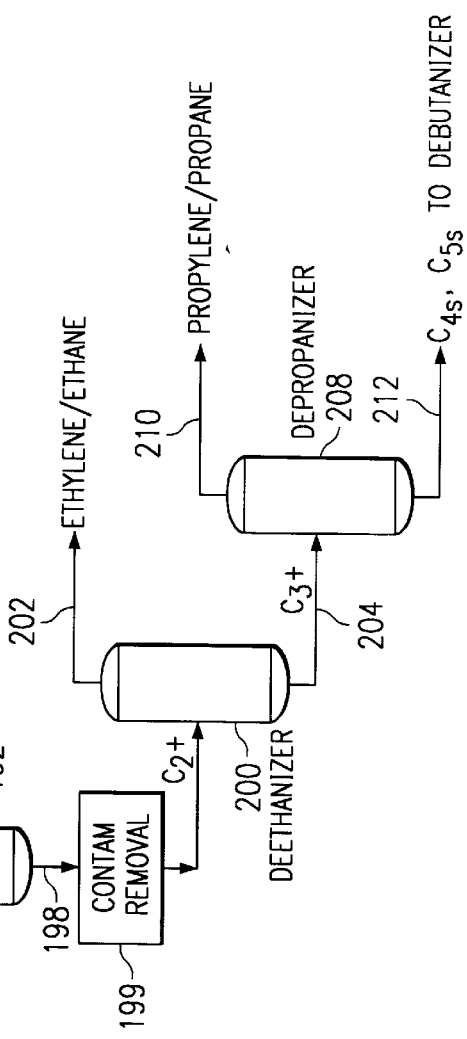
FIG. 6B

CAT CRACKER GAS PLANT PROCESS FOR INCREASED OLEFINS RECOVERY

This is a continuation of application Ser. No. 09/255,281, filed Feb. 22, 1999, now U.S. Pat. No. 6,271,433 entitled Improved Cat Cracker Gas Plant Process for Increased Olefins Recovery, and the benefit of the filing date thereof is hereby claimed. The specifications, drawings, inventor declarations, and information disclosures of said original application are hereby incorporated by reference.

INVENTORS

The invention that is the subject of this application was invented by the following:

| Name | Address | Country of Citizenship |
|---|---|---|
| Ginger S. Keady | 1710 Stemply Ct. Houston, Texas 77094 | U.S.A. |
| Juan Puerto | 2015 Briarstem Houston, Texas 77077 | U.S.A. |
| Berj Garbouchian | 18019 Shireoak Drive Houston, Texas 77084 | U.S.A. |

BACKGROUND

1. General

Conventional processes for the separation and recovery of products in a fluid catalytic cracking unit (also referred to as a "cat cracker," "cat cracking," or "FCC" unit) of a petroleum refinery do not provide for efficient recovery of the increased quantities of light olefinic products that may be desirably produced with advances in cracking catalyst technology and cat cracker design. The present invention is a new process for the improved separation and recovery of products, especially ethylene and propylene, produced in the cracking reaction of a cat cracker. More specifically, the present invention is a new process for separation and recovery of products from a cat cracker such as the Deep Catalytic Cracking unit described in more detail herein that utilizes recent advances in technology for increased ethylene and propylene production.

In the cracking reaction of conventional fluid catalytic cracking units of petroleum refineries, a hydrocarbon feedstock may be catalytically converted into a variety of products commonly known as slurry oil, heavy cycle oil, light cycle oil, naphtha, and various components lighter than naphtha. The term "naphtha" as used herein means a process stream that contains predominantly five carbon and heavier chemical components with an end point of approximately 430° F. The term "naphtha" as used herein may include a debutanized stream of cracked hydrocarbons that may be processed and used, for example, as a gasoline blending stock. Of course, the particular products from any particular cat cracker unit depend on a variety of factors including the design and needs of the petroleum refinery. The products that include naphtha and lighter components are separated into various product streams in the section of the refinery commonly referred to as the "gas plant," "gas concentration plant," "gas recovery unit," or "unsaturated gas plant" of the cat cracker unit. These terms are commonly used to refer to that portion of a cat cracking unit that includes the wet gas compressor and equipment downstream of the compressor. The products from the gas plant vary depending on the particular refinery design but commonly include naphtha (as defined herein), $C_4$s (butylenes and butanes), propane, propylene, and a stream (commonly referred to as "fuel gas") that contains ethane and lighter components ($C_2$ and lighter).

Importantly, conventional cat cracker gas plant processes separate, at the front end of the gas plant, an "ethane and lighter" stream from a "propylene and heavier" stream. Such conventional cat cracker gas plant processes that include a deethanization step at the front end of the gas plant are described in various treatises. See Nelson's Petroleum Refinery Engineering (McGraw Hill 1949, pp. 759–810); Meyer's Handbook of Petroleum Refining Processes (Second edition 1997, pp. 3.1–3.112); Petroleum Refinery Distillation by Watkins, Second Edition. The deethanization step at the front end of the cat cracker gas plant, and the other features of the conventional cat cracker gas plant as described herein, do not provide for efficient separation of the light olefinic components (such as ethylene and propylene) of the cat cracker reaction products.

In the conventional cat cracker gas plant, the ethane ($C_2$) and lighter stream may be routed to the refinery fuel gas system or further processed to separate ethane and ethylene from the methane and lighter components. The propylene and heavier stream from the front end of a conventional gas plant is typically further processed to separate a stream that is a naphtha (predominantly $C_5$+) fraction from the $C_4$ and lighter fraction, which may also be further processed to separate the $C_3$s (propane and propylene) and $C_4$s or processed directly in an alkylation unit.

The product yields from a conventional cat cracker unit vary depending on a wide range of design and operating parameters, such as feedstock quality, the amount of regenerated catalyst supplied to the riser reactor per volume or mass unit of feed, the temperature at which the cracking reaction takes place, the residence time of the feed in the riser reactor, and the like. The conventional fluid catalytic cracking unit may process one or more feedstocks. Typical feedstocks may include atmospheric gas oils, heavier feedstocks from vacuum distillation units, and streams from other units such as cokers, visbreakers, hydrotreaters, and hydrocrackers. The design criteria for conventional fluid catalytic cracking units depend on the feedstock quality, the amount of coke formed on the cracking catalyst during the reaction, the level of contaminants in the feedstock (such as metal contaminants that deactivate the cracking catalyst) and the like.

2. Increased Demand for Olefinic Products: Deep Catalytic Cracking

New catalysts and cat cracker designs have been developed recently in an effort to respond to increased demand for olefinic products from the fluid catalytic cracking unit of a refinery. These recent developments for increased olefin production include changes to the zeolite catalysts typically used in cat crackers and changes in plant process equipment design. For example, the "Deep Catalytic Cracking" (or "DCC") process yields increased proportions of olefinic compounds in comparison to conventional fluid catalytic crackers. As used herein, the term Deep Catalytic Cracking means the process described in U.S. Pat. Nos. 4,980,053 and 5,326,465, the disclosures of which are incorporated herein by reference, and a process that utilizes the catalyst disclosed in U.S. Pat. Nos. 5,232,675, 5,358,918, and 5,380,690, the disclosures of which are incorporated herein by reference. Also see the Handbook of Petroleum Refining Process, second edition, (1997) edited by Robert A. Meyers and published by McGraw-Hill, Chapter 3.5 (pp. 3.101–3.112) entitled "Deep Catalytic Cracking, the New Lights Olefin Generator," the disclosures of which are incorporated herein by reference. DCC is a fluidized catalytic process for selectively cracking a variety of feedstocks to light olefins. Unlike a steam cracker, the predominant products from a DCC unit are propylenes and butylenes, the direct result of catalytic cracking rather than free radical thermal reactions. The DCC unit may be operated in two distinct modes: Maximum Propylene (Type I) or Maximum Iso-Olefin (Type II). Each mode of operation employs a unique catalyst as well as reaction conditions. DCC reaction products are light olefins (such as ethylene and propylene), high octane gasoline, light cycle oil, dry gas and coke. A small amount of slurry oil is produced.

DCC Maximum Propylene operation (Type I) employs both riser and bed cracking at severe reactor conditions. DCC Maximum Iso-Olefin (Type II) operation utilizes riser cracking, like a modem FCC unit, at slightly milder conditions than a Type I operation.

Each mode of DCC operation employs a unique catalyst as well as reaction conditions. DCC reaction products are light olefins, high octane gasoline, light cycle oil, dry gas and coke. As used herein, dry gas means a stream of hydrogen and methane. A small amount of slurry oil is produced.

Innovations in the areas of catalyst development, process variable selection and anticoking techniques enables the DCC unit to produce significantly more olefins than a conventional FCC unit. Table 1 compares pilot plant product yields for a Deep Catalytic Cracking Unit and a conventional cat cracker (maximum gasoline mode) and illustrates the increased light olefin production from a DCC Unit.

TABLE 1

Pilot Plant Yields
DCC Product Slate and Yield Structure

| Process | DCC Type I | DCC Typ II | FCC |
|---|---|---|---|
| Material Balance, wt % | | | |
| $C_2$ Minus | 11.9 | 5.6 | 3.5 |
| $C_3$ & $C_4$ | 42.2 | 34.5 | 17.6 |
| Naphtha | 26.9 | 39.5 | 54.9 |
| LCO | 6.9 | 10.3 | 10.4 |
| DO | 6.1 | 5.8 | 9.3 |
| Coke | 6.0 | 4.3 | 4.3 |
| Total | 100.0 | 100.0 | 100.0 |
| Olefin Yield, wt % | | | |
| Ethylene | 6.1 | 2.3 | 0.8 |
| Propylene | 21.0 | 14.3 | 4.9 |
| Butylene | 14.3 | 14.7 | 8.1 |
| Feed: | Waxy Chinese Vacuum Gas Oil Pilot Plant Data | | |

As used in Table 1, "$C_2$ Minus" refers to ethane and lighter components; "$C_3$ & $C_4$" refer to three and four carbon compounds respectively; "Naphtha" has the meaning previously described herein; "LCO" refers to light cycle oil; "DO" refers to decant oil, also known as slurry oil; and "coke" refers to carbonaceous deposits on catalyst resulting from the cracking reaction. The Olefin Yield section of Table 1 shows weight percentages of specific olefin compounds.

Historically, the light gases such as ethylene and propylene separated in the cat cracker gas plant were of lesser value and concern than the gasoline product. However, because olefins are now a significant product from a cat cracker and an important source of revenue, there is currently a need to increase the production and recovery of these olefinic products, such as propylene and ethylene.

As noted in Table 1, the Deep Catalytic Cracking Unit produces more ethylene and propylene than a conventional cat cracker. Whereas a conventional cat cracker reactor typically produces up to approximately 5 weight percent or slightly higher (based on reactor fresh feed mass rate) propylene, proprietary catalytic cracking units that are specifically designed to produce more propylene (such as the Deep Catalytic Cracking unit) can produce up to approximately 20 weight percent (based on fresh feed mass rate) propylene in the reactor.

Existing catalytic cracking units that were not originally designed and constructed for increased olefin production may be modified or "revamped" to incorporate new technology that increases the production of olefinic compounds such as ethylene and propylene. The addition of catalytic cracking catalyst specifically formulated for increased ethylene and/or propylene yields in the catalytic cracking reaction will result in the need for a new gas plant process that efficiently accommodates the increased light olefin production. In addition to catalyst changes, the process equipment of an existing cat cracker may be revised to provide increased yields of light olefins. For example, changes to the riser/reactor and related equipment may provide increased olefin production.

Propylene recovery (the portion of propylene in the gas plant feed recovered as propylene produce in conventional gas plants ranges from 80–95 percent (with the remainder of the propylene being lost to other streams). Some refiners attempt to reduce the amount of light olefins lost to fuel gas streams with a "stand-alone" recovery train to separate $C_2$ and $C_3$ olefins from the lighter gases, such as the $C_2$ and lighter gases from the deethanization step at the front end of the conventional cat cracker gas plant. However, ethylene and propylene recovery via such a stand alone system dedicated to processing the light gases destined for the fuel gas system results in redundancy of expensive processing equipment. Moreover, in gas plant processes with a front-end deethanizing step accomplished in an absorber tower followed by a stand-alone recovery train for the $C_2$ and lighter stream, the $C_4$ content of the propane recovered from the $C_2$ and lighter stream may fluctuate due to swings in the $C_4$ content of the absorber overhead.

Therefore, in light of new processes with increased olefin yields, such as the Deep Catalytic Cracking process, and the increased light olefin yields that may be accomplished through changes to existing cat cracker units, there exists a need for a new gas plant process that provides efficient recovery of ethylene and propylene from such processes and units.

SUMMARY

The invention relates to a new process for more efficient separation and recovery of light olefins (such as ethylene and propylene) in a cat cracker gas plant and is particularly advantageous when used in a DCC unit gas plant. Specifically, as but one aspect of the new process, the new cat cracker gas plant process separates, at the front end of the gas plant, a "propane and lighter" stream from a "$C_4$ and heavier" stream. This new process that includes a "depropanization" step at the front end of the cat cracker gas plant (as opposed to the front end deethanization step of the prior art) results in a stream that contains predominantly $C_4$ and heavier components and a stream that contains predominantly $C_3$ and lighter components. The resulting stream that contains propane and lighter components (including but not limited to substantially all of the ethylene and propylene formed in the cat cracking reaction and fed to the gas plant) is further processed via compression, chilling (cooling), and distillation to maximize olefins recovery. The new process is particularly useful for efficiently separating and recovering olefins from a Deep Catalytic Cracking unit that produces increased levels of olefins via advances in cracking catalyst technology and/or design features.

The new process described herein achieves, among other advantages, increased light olefin recovery efficiency while eliminating the installation and operating costs for absorber towers and associated equipment employed in conventional cat cracker gas plants for the separation of propylene and heavier components from a stream containing ethane and lighter component. In this new process, the need for one or more absorber towers to remove propylene from a $C_2$ and lighter stream, and the expensive processing of the lean/rich oil streams associated therewith, are eliminated. The elimination of the need for a lean oil stream reduces energy costs and, in conventional cat cracker units wherein the rich oil used for absorption of $C_3$ and heavier components is recycled to the distillation tower that processes effluent directly from the cat cracker reactor (known to those skilled in the art as the Main Fractionator), reduces the amount of material that must be processed in the Main Fractionator and thereby may reduce the height of the Main Fractionator or allow for additional pumparound capabilities for the Main Fractionator.

It has been discovered that the need for a contaminant removal system that removes contaminants such as hydrogen sulfide and carbon dioxide on the overhead of the Debutanizer tower of the conventional cat cracker gas plant (which is described in detail below) is eliminated because significant quantities of such contaminants do not enter the gas plant Debutanizer tower in the new process; rather, these contaminants appear in the $C_3$ and lighter fraction separated at the front end of the new cat cracker gas plant process. The $C_4+$ (butylene and heavier) stream separated at the front end of the new gas plant process contains so little contaminants (such as hydrogen sulfide and carbon dioxide) that no contaminant removal (such as $H_2S$ or $CO_2$ removal) is required on the $C_4+$ stream.

The new process will provide better control over the specification for the $C_4+$ content of a propane product stream because fluctuations in composition associated with the operation of a front end gas plant deethanizing absorber of the prior art are eliminated.

In this new process, the gas plant Debutanizer tower may be smaller than that of a conventional cat cracker gas plant because the Debutanizer feed is low in $C_3$ content. Moreover, the operating pressure and bottoms temperatures are lower in the Debutanizer tower of the new process when compared to conventional cat cracker gas plant Debutanizer towers. A lower Debutanizer tower bottoms temperature is desirable because fouling of the Debutanizer tower and associated equipment is accelerated at higher Debutanizer tower bottoms temperatures.

The cooling requirements of the new gas plant process are such that the need for an ethylene refrigeration system associated with gas plants of the prior art is eliminated, thus reducing installation costs and operating costs. Of course, if necessary or desirable due to a particular plant's specifications or feedstocks, an ethylene refrigeration system or other refrigeration system, such as a mixed ethylene/propylene refrigeration system, may also be used with the new process.

The new process invention for recovering olefins from a mixture of cracked hydrocarbons from a fluid catalytic cracker comprises the steps of: (a) providing a mixture of cracked hydrocarbons including methane, ethylene, ethane, propylene, propane, butylene, butane and heavier hydrocarbons such as naphtha produced in a fluid catalytic cracker; (b) separating said mixture into (i) a first stream comprising substantially all of said ethane, ethylene, and methane and a major portion of said propane and propylene and (ii) a second stream comprising a portion of said butylene and butane, and a major portion of said heavier hydrocarbons; and (c) processing said first stream to recover the ethylene and propylene therefrom, and the details of such process described herein.

DRAWINGS

FIG. 1 illustrates the overall process scheme for a fluid catalytic cracking unit (prior art).

FIG. 2 illustrates the Main Fractionator distillation tower of a fluid catalytic cracking unit (prior art).

FIG. 7 illustrates an alternative embodiment of the new gas plant process that produces a $C_2$ rich stream in the Deethanizer overhead without the use of a Demethanizer tower.

Corresponding streams on different Figures bear like numbers.

DETAILED DESCRIPTION

Conventional Cat Cracker Gas Plant

Figure 3:
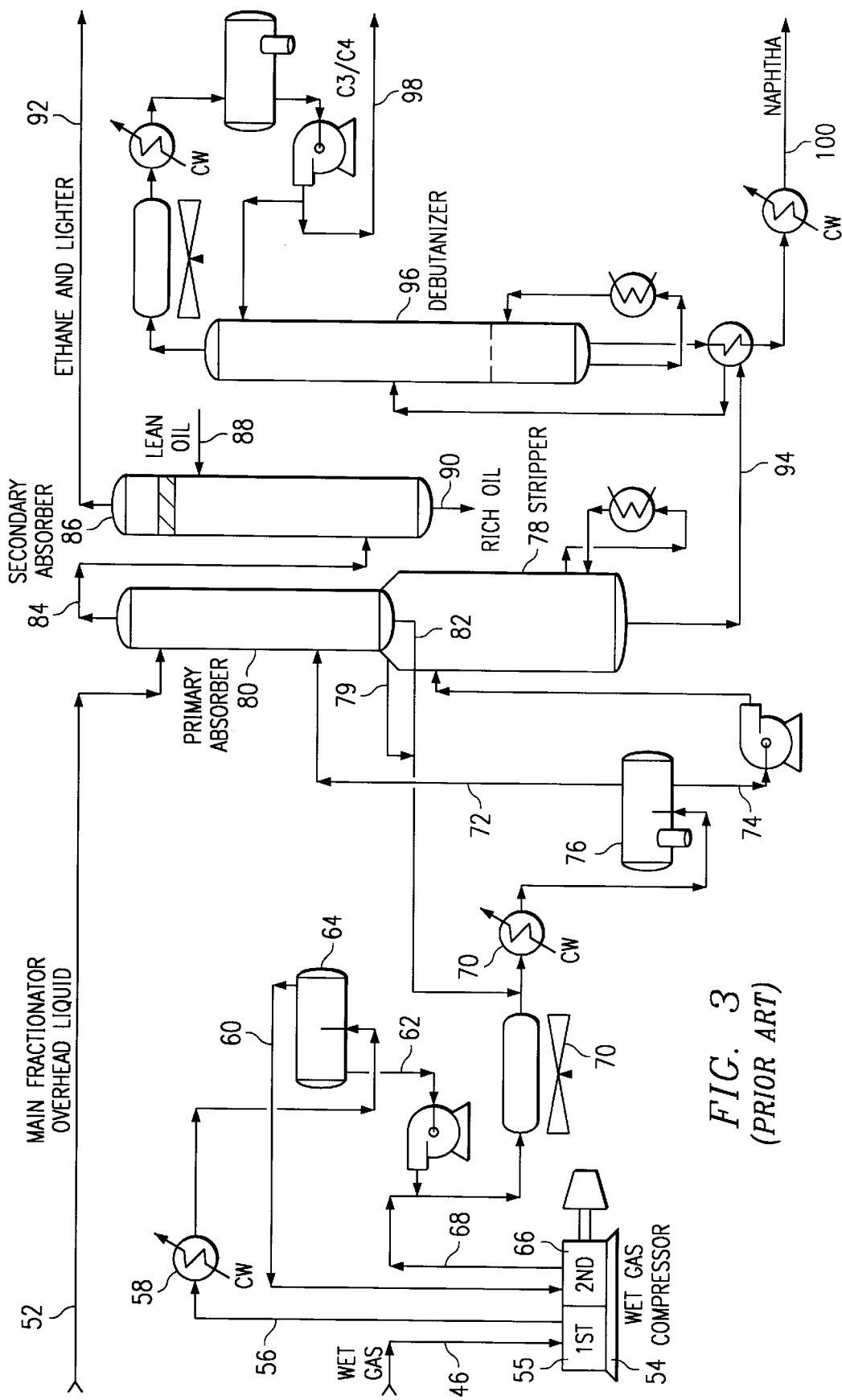
FIG. 3 illustrates a conventional cat cracker gas plant process downstream of the Main Fractionator (prior art).

FIG. 1 shows the overall process scheme for a typical cat cracker unit of the prior art. An air stream 2 is used to facilitate combustion of carbon on the spent catalyst provided to the regenerator 4 via a transfer line 6 from the reactor 8, also referred to as a disengager. The combustion of carbon forms flue gas which is removed as a stream 10 from the regenerator. The regenerated catalyst is transferred via a transfer line 12 to the riser (also referred to as a riser reactor) 14 wherein the cat cracker feed stream 16 is introduced. The catalytic conversion of the feed 16 to cracked hydrocarbon takes place in the riser 14 and reactor (disengager) 8. The spent catalyst is disengaged from the cracked hydrocarbons in the reactor 8, and the cracked hydrocarbon stream 18 is fed to the Main Fractionator tower 20.

The Main Fractionator 20 yields a variety of product streams. Although the characteristics of such streams vary, typical Main Fractionator product streams include a slurry stream 22, a heavy cycle oil stream 24, and a light cycle oil stream 26. The Main Fractionator overhead stream 30 is processed in a system that typically includes overhead condensers, reflux drums, and the like (the details of which are not shown in FIG. 1 but which are known to those skilled in art). The hydrocarbons from the Main Fractionator overhead system are processed in the gas plant 32. Typical products from the gas plant 32 may include a stream of ethane and lighter components 34 (which may be further processed for separation of the components thereof), propylene/propane 36, butylene/butane 38, and debutanized naphtha 40.

Figure 4A:
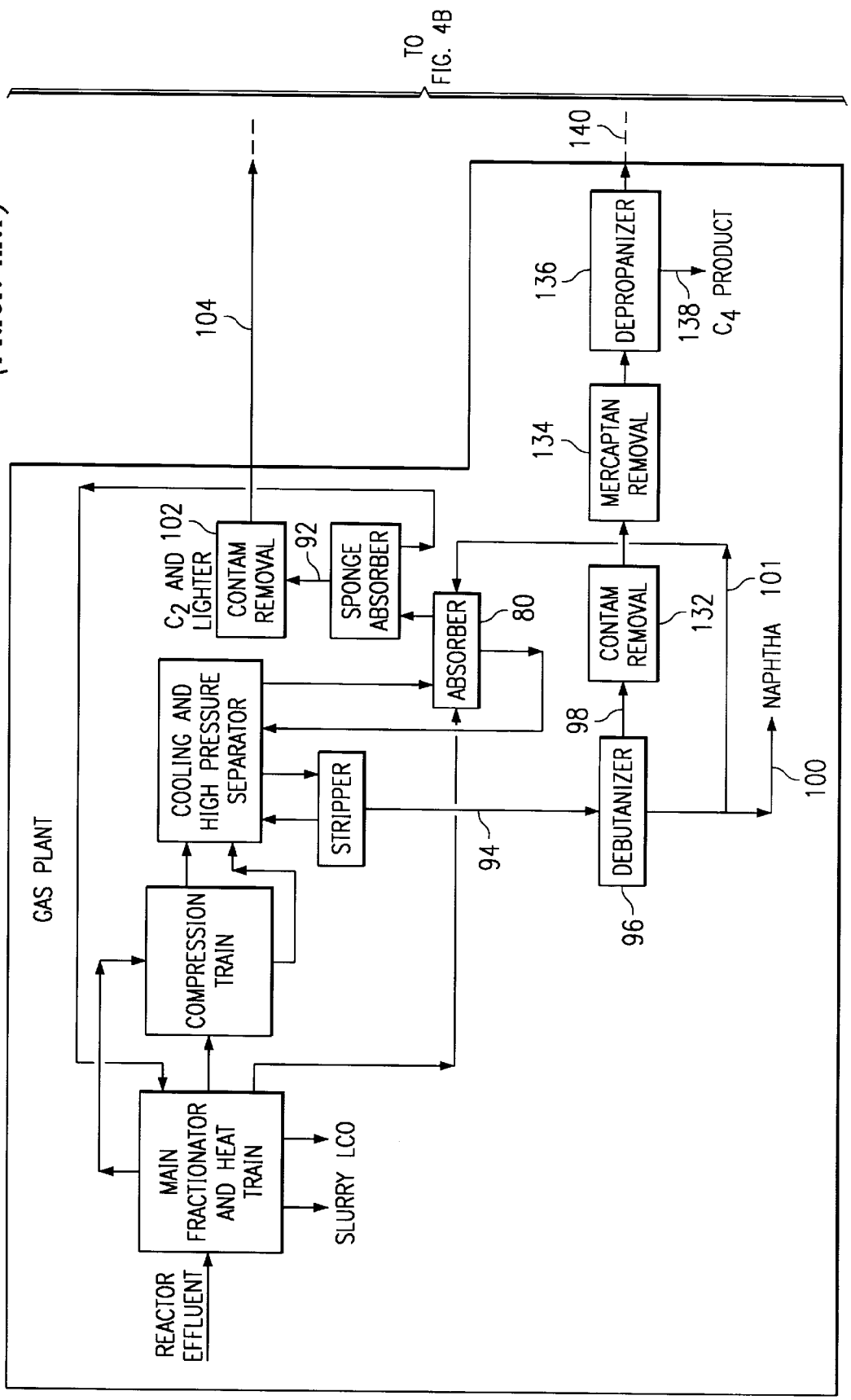
FIG. 4 illustrates a conventional cat cracker gas plant that includes downstream processing of the ethane and lighter stream and the $C_3/C_4$ stream from the Debutanizer overhead (prior art).
Figure 4B:
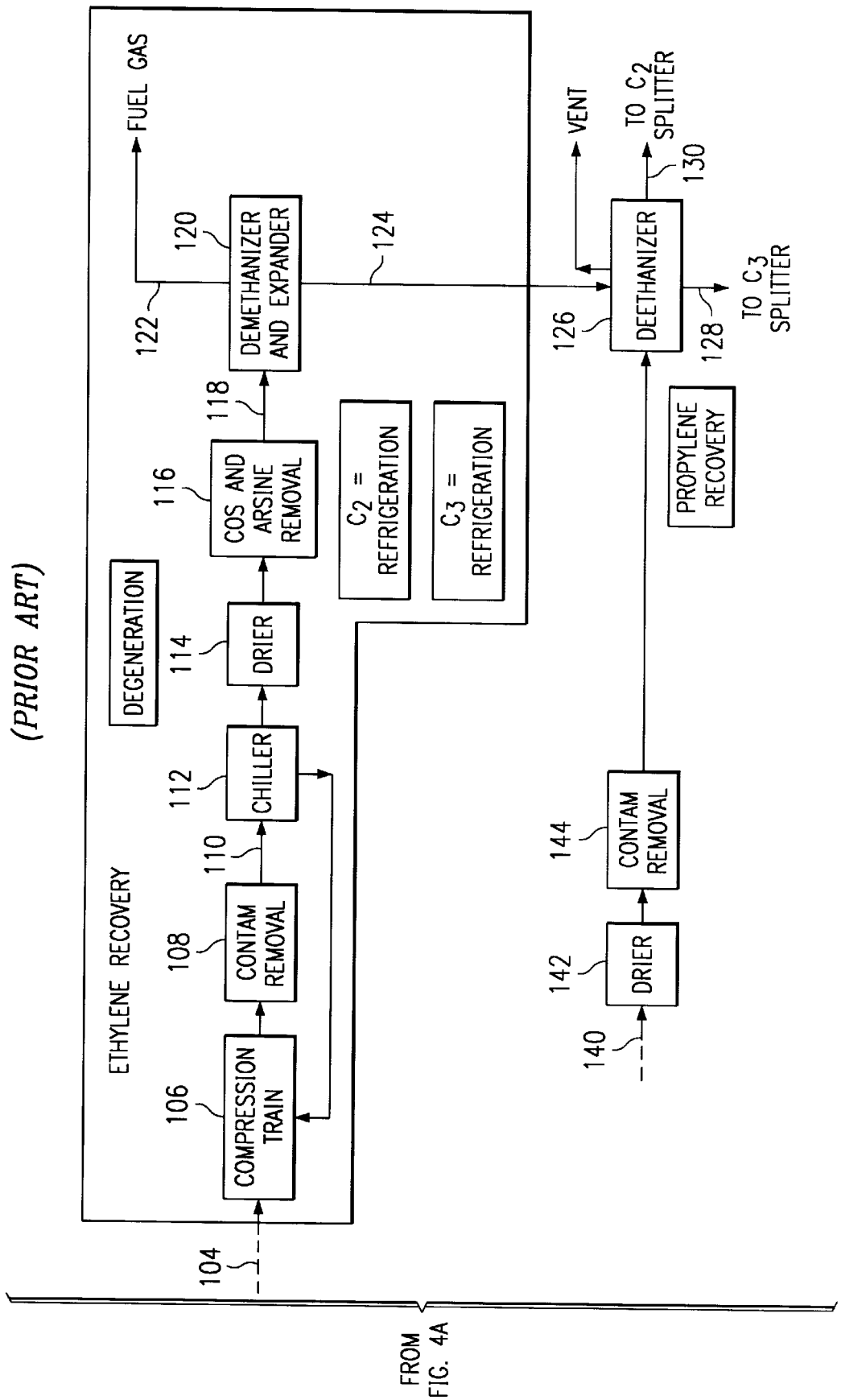

A conventional cat cracker gas plant of the prior art is included in the process illustrated in FIGS. 2–4. As illustrated in FIG. 2, in the conventional fluid catalytic cracking unit, the cracked products from the aforementioned reactor are fed to a distillation tower 20 commonly referred to as the "Main Fractionator." The Main Fractionator 20 typically separates the cracked products into a variety of process streams. These streams vary depending on the particular unit but typically may include streams that are recognized by one skilled in the art as slurry oil 22, as heavy cycle oil 24 and light cycle oil 26, and an overhead product stream 30 that typically includes the fractions of cracked products with naphtha and lighter components.

A side draw stream 88 from the Main Fractionator 20 may be used as lean oil in, for example, a light ends absorber tower, and the rich oil stream 90 from such service may be returned to the Main Fractionator 20. As shown in FIG. 2, the overhead stream 30 from the Main Fractionator 20 may be partially condensed in one or more heat exchangers 42, and the resulting condensed liquid 44 separated from the noncondensed gas 46 in a separator vessel 48. The condensed liquid stream 44 is predominantly $C_5$ and heavier components. In the typical cat cracker unit, a portion of the condensed liquid stream 44 is routed back to the Main Fractionator 20 as a reflux stream 50 and a portion 52 (the "Main Fractionator overhead liquid stream") may be routed to the primary absorber tower 80 (shown in FIG. 3). The remaining, uncondensed gas 46 from the separator vessel 48 is commonly referred to as "wet gas," and is predominantly $C_4$ and lighter components but may include heavier components as well.

As shown in FIG. 3, the wet gas 46 is compressed in a compressor 54 (typically referred to as the "wet gas compressor") that may include multiple stages of compression. For example, in a two stage wet gas compressor, the first stage 55 discharge stream 56 is cooled and partially condensed in heat exchanger(s) 58, and the resulting vapor stream 60 and liquid stream 62 are separated in a low pressure separator 64. The vapor 60 from the low pressure separator 64 is compressed in the second stage 66 of the wet gas compressor 54, and the second stage discharge stream 68 is cooled and partially condensed in heat exchanger(s) 70. The resulting vapor stream 72 and liquid stream 74 are separated in a high pressure separator 76. The liquid stream 74 from the high pressure separator 76 is fed to a stripper tower 78. The vapor stream 72 from the high pressure separator 76 is fed to a primary absorber tower 80. The high pressure separator vapor stream 72 and the high pressure separator liquid stream 74 typically contain mixtures of components that include substantial quantities of propylene.

In a conventional cat cracker gas plant, the ethane and lighter components in the high pressure separator vapor stream 72 are typically separated from the propylene and heavier components in stream 72 in one or more towers typically referred to as deethanizing absorber tower(s) and strippers. The Main Fractionator overhead liquid stream is used to absorb propylene and heavier components from the high pressure separator gas stream 72 in one or more absorber towers. A slip stream of debutanizer bottoms, an absorber reflux stream and/or absorber intercooling can be used to increase absorber propylene recovery. A variety of absorber configurations are possible. Refiners sometimes use a "sponge oil" or "secondary" absorber tower to process the lean gas from a primary absorber to further reduce the amount of propylene and heavier components contained in the $C_2$ and lighter stream. A sponge oil from the Main Fractionator 20 can be used as an absorbing medium. In FIG. 3, the high pressure separator vapor stream 72 is fed to a primary absorber 80. Main Fractionator overhead liquid 52 is used as the lean oil for the primary absorber tower 80. The rich oil stream 82 may be routed upstream of the high pressure separator 76. In the configuration shown in FIG. 3, lean gas 84 from the primary absorber 80 is fed to a secondary absorber 86, supplied with lean oil 88. The lean oil 88 may be a side draw stream from the Main Fractionator 20.

The stripper overhead stream 79 that contains the $C_2$ and lighter components stripped from the high pressure separator liquid stream 74 may be routed upstream of the high pressure separator 76. In a conventional cat cracker gas plant, the rich oil 90 leaving the secondary absorber 86 may be returned to the Main Fractionator 20 to recover the $C_3$s, $C_4$s, and $C_5$s absorbed from the lean gas 84.

In the conventional cat cracker gas plant, the stripper tower 78 separates ethane and lighter components (as the tower overhead) from propylene and heavier components (the tower bottoms). However, water condensation in the stripper tower 78 may hamper stable and efficient operation and control. The stripper bottoms stream 94 is fed to a Debutanizer tower 96 that separates butane and lighter materials as an overhead stream 98 from a debutanized naphtha bottoms stream 100.

Although a variety of configurations involving absorbers and strippers appear in the prior art, importantly, the cat cracker gas plants of the prior art separate ethane and lighter components (i.e., deethanize) as the first major separation of products. This conventional "deethanization first" gas plant configuration is due to the historical yields and product values of streams from conventional cat crackers. The $C_2$ and lighter products 92 may be used as refinery fuel gas or further processed.

In a gas plant of the prior art such as that shown in FIG. 4 that further processes the $C_2$ and lighter stream from the deethanizing absorber/stripper towers, the $C_2$ and lighter stream 92 is treated in a system 102 to remove contaminants, such as hydrogen sulfide and carbon dioxide. A variety of processes, such as treatment by contact with liquid amine, and most commonly diethanolamine, are known for removal of these contaminants.

After leaving the system 102 provided for removal of contaminants such as hydrogen sulfide and carbon dioxide, the "sweet" $C_2$ and lighter stream 104 may be further compressed in a compressor 106 and treated in a system 108 for removal of residual contaminants, such as residual hydrogen sulfide, carbon dioxide, and oxygen. The treated $C_2$ and lighter stream 110 is next chilled in heat exchangers 112, dried in fixed bed drier(s) 114, treated for residual contaminant removal (such as, for example, contaminant carbonyl sulfide) in a system 116 known to those skilled in the art, and fed to the Demethanizer tower 120. The Demethanizer tower 120 separates methane and lighter components, such as hydrogen, from the ethylene and heavier components contained in the Demethanizer tower feed stream 118. The Demethanizer tower overhead stream 122 (comprising methane, hydrogen, and other light components) is typically used as fuel gas. Rotating equipment, commonly referred to as expanders, may be used on the Demethanizer tower overhead system to achieve additional cooling and removal of a portion of the components heavier than methane from the Demethanizer overhead stream.

The Demethanizer tower bottoms stream 124 contains ethylene and heavier components that may be fed to a Deethanizer tower 126 for separation of the ethane/ethylene components as an overhead stream 130 from the propylene/propane components as a bottoms stream 128.

The stripper bottoms stream 94 is fed to the Debutanizer tower 96. The Debutanizer bottoms stream 100 (generally designated herein as naphtha) contains components that may be further processed and used as gasoline-blending material. If desired, a slipstream 101 of the naphtha may be used as lean oil in the primary absorber 80 for removal of the propylene and heavier components from the ethane and lighter stream.

The Debutanizer tower overhead stream 98 is typically treated for removal of contaminants (such as hydrogen sulfide and carbon dioxide) using a system 132, such as liquid amine contactors, known to those skilled in the art. The Debutanizer tower overhead stream 98 may also be treated for removal of mercaptan contaminants in a system 134 that uses caustic or other effective chemicals or catalyst as the treatment medium.

The Debutanizer tower overhead stream 98 may be fed to a Depropanizer tower 136. The Depropanizer bottoms stream 138 is the butane/butylene product. The Depropanizer overhead stream 140 contains propane and lighter components and may be dried in driers 142, treated for contaminant removal in an appropriate process system 144, and fed to the Deethanizer tower 126 along with the Demethanizer bottoms stream 124.

The Deethanizer tower 126 separates ethane and ethylene as the overhead product 130 from propylene and propane as the bottoms product 128. The $C_3$s may be separated into propylene and propane streams in a $C_3$ Splitter tower if desired, and the $C_2$s may be separated into ethylene and ethane in a $C_2$ Splitter tower.

One skilled in the art will recognize that the various distillation towers in the conventional gas plants typically include overhead condensers, reflux streams, reboilers, and the like. The cat cracker gas plant of the prior art such as that illustrated in FIG. 4 typically requires both ethylene and propylene refrigeration systems for cooling various process streams, including the overheads of various towers and various tower feedstreams.

As described above, the gas plants of the prior art typically require multiple contaminant removal systems because contaminants such as hydrogen sulfide and carbon dioxide are found in both the $C_2$ and lighter stream and the $C_3$+ (propylene and heavier) stream from the conventional deethanizing stripper/absorber section of the gas plants of the prior art.

The Invention

Definitions

As used herein, the terms "fluid catalytic cracking unit," "FCC," "fluid catalytic cracker" and "cat cracker" refer to any of the known processes used in petroleum refineries whereby hydrocarbon feedstock is catalytically converted to products using catalyst that is regenerated in a substantially fluidized bed and mixed with hydrocarbon feedstock in a riser generally known by those skilled in the art to be a fluidized, moving, or transfer line reactor, or in a fluidized bed of catalyst. For purposes hereof, the term "fluid catalytic cracking unit" also includes the process known as "Deep Catalytic Cracking" as defined and described herein. The "gas plant" portion of a cat cracker unit includes that section of a cat cracker unit as described herein that utilizes distillation, heat transfer, and other unit operations to separate and recover the naphtha and lighter fractions of the products from the cat cracker reaction. Unless otherwise indicated herein, it is to be understood that a distillation tower referenced herein includes related systems such as overhead cooling systems, reflux systems, reboiler systems, pumps, and the like with a rectifying and stripping section even though such systems are not expressly referenced. The term "Stripper" as used in conjunction with the new process described herein means a column used to remove the more volatile component from a liquid feed, and in the preferred embodiment the Stripper includes only a stripping section.

One skilled in the art will understand that the reference or name assigned herein to a particular process stream may be indicative of the content of the process stream but does not preclude the presence of components not included in the name; for example, one skilled in the art will understand that a reference to a stream as a "$C_2$ and lighter stream" does not, due to the physical laws of phase equilibrium that govern distillation and other separation processes, imply that the stream must always contain absolutely zero percent of any components heavier than $C_2$. The terms "lighter" and "heavier" refer to the relative boiling characteristics and volatilities of chemical components. One skilled in the art will recognize that a distillation process involves vapor-liquid equilibria phenomena such that a complete separation of components via distillation or partial condensation of a process stream is often impractical or impossible. Therefore, when a particular process stream leaving a distillation tower (or vapor/liquid separation drum) is described herein as comprising, including, or containing "substantially all of" a specified component from the feed to the tower or drum, one skilled in the art will recognize that, due to vapor/liquid equilibria phenomena, other streams may contain relatively small amounts of said component consistent with vapor/liquid phase equilibria at the conditions of the respective process streams. As used herein, the phrase "major portion" or "majority" of a component from a stream means more than 50 percent of the respective component from the stream referenced. A "minor portion" means less than half.

The term "naphtha" as used herein a stream that contains predominantly five carbon and heavier chemical components with an end point of approximately 430° F. The term "naphtha" as used herein may include a debutanized stream of cracked hydrocarbons that may be processed and used, for example, as a gasoline blending stock. Unless otherwise indicated, all percentages expressed herein are weight percent, all temperatures are degrees Fahrenheit, and all pressures are pounds per square inch absolute (psia). Pressures designated as pounds per square inch gauge are denoted with the abbreviation "psig."

Detailed Description of New Process

Figure 5A:
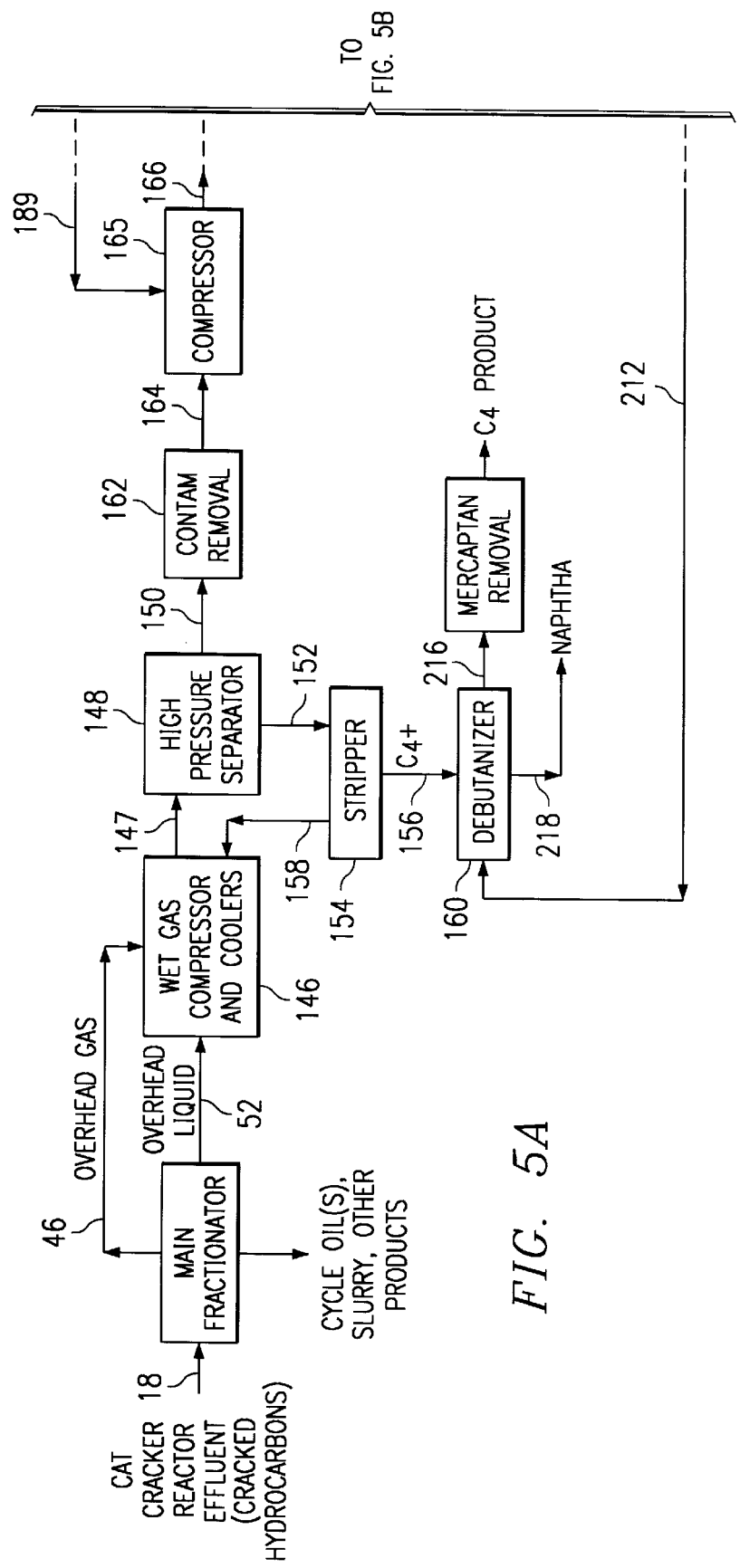
FIG. 5 illustrates a version of the new gas plant process that includes separation of a "propane and lighter" stream from heavier components.
Figure 5B:
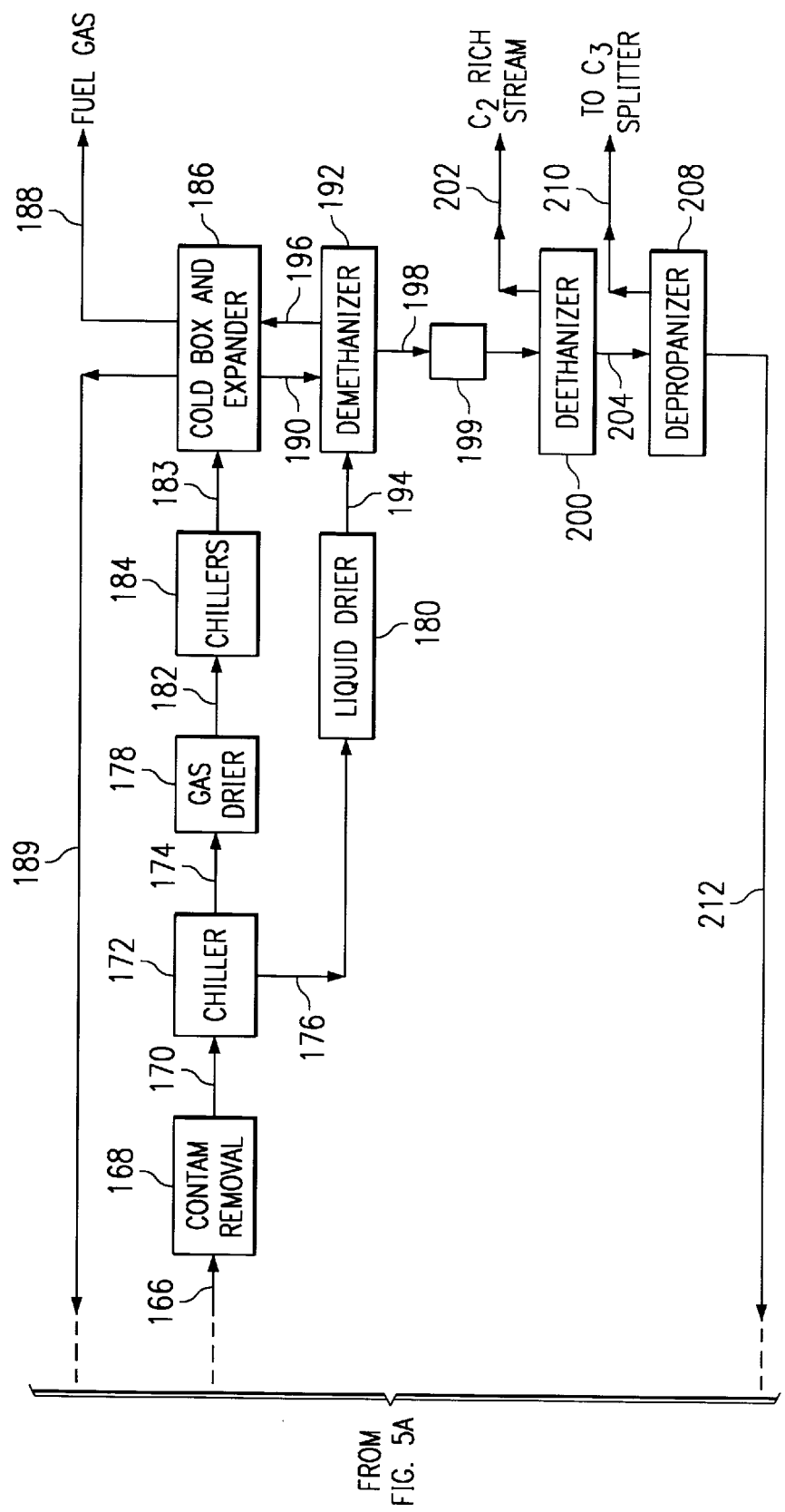

In the embodiment of the new process shown in FIG. 5, cracked hydrocarbon products from a cat cracker reaction are provided to a cat cracker gas plant. The Main Fractionator associated therewith may be operated to provide streams of slurry oil (decant oil), heavy cycle oil, light cycle oil, possibly other tower side streams, a Main Fractionator overhead liquid stream and a wet gas stream. The cracked hydrocarbons include naphtha, $C_4$s (butanes and butylenes), propane, propylene, ethane, ethylene, methane, hydrogen, and may be accompanied by various contaminants, such as, for example, hydrogen sulfide, carbon dioxide, oxygen, mercury, carbonyl sulfide (COS), ammonia and arsenic. Nitrogen and water may also be present in the feed provided to the gas plant. In the preferred embodiment, the new process is used to process hydrocarbons produced in a Deep Catalytic Cracking ("DCC") Unit, the aforementioned fluidized catalytic process for selectively and preferentially converting a variety of cat cracker feedstocks to light olefins, such as ethylene and propylene.

The cracked hydrocarbons provided to the cat cracker gas plant may be in the form of a Main Fractionator overhead gas stream 46 (also called a "wet gas" stream) and a Main Fractionator overhead liquid stream 52. The wet gas stream 46 comprises hydrogen, methane, ethylene, ethane, propylene, propane, $C_4$s (butylene and butane), naphtha, water, and may include one or more contaminants. The Main Fractionator overhead liquid stream 52 comprises predominantly naphtha. The cracked hydrocarbons in the Main Fractionator overhead gas stream 46 and liquid stream 52 are pressurized to approximately 120–300 psig, and preferably to 150–220 psig, in a system 146 that includes a wet gas compressor train (the details of which are not shown in FIG. 5) and coolers (not shown in FIG. 5) that cool the wet gas compressor discharge streams. The pressure is selected to facilitate the separation and recovery of ethylene and propylene via distillation in the new process and may vary according to compositions of the gas plant feed. The compressed and cooled hydrocarbons 147 are fed to a high pressure separator 148 where condensed hydrocarbons are separated from gaseous hydrocarbons. The high pressure separator 148 may be operated at a pressure of 120–270 psig, and preferably is operated at 130–200 psig. The temperature of the contents of high pressure separator 148 is approximately 80–120 degrees F., and preferably 95–110 degrees F. The pressure and temperature of the high pressure separator 148 may vary depending on the composition of the hydrocarbons present therein. The high pressure separator 148 temperature and pressure are selected to produce a high pressure separator gas stream 150 that includes a major portion of, and preferably substantially all of, the $C_3$ and lighter components and contaminants from the cracked hydrocarbons provided to the gas plant and substantially all of the ethylene, ethane, methane, and hydrogen from the cracked hydrocarbons provided to the gas plant and may include a portion of the $C_4$s (butylene, butane) and naphtha present in the hydrocarbons provided in the feed to the gas plant. (Note that the liquid stream 152 may include quantities of propane and lighter components. However, these propane and lighter components are stripped from the liquid in Stripper 154 and, in the embodiment shown in FIG. 5, recycled to a point upstream of the high pressure separator 148. Therefore, on an overall basis, the high pressure separator vapor stream 150 includes a major portion of, and preferably substantially all, of the propane and lighter components in the cracked hydrocarbons provided to the gas plant and may include a portion of the $C_4$s and a relatively small amount of naphtha provided to the gas plant.)

Referring to FIG. 5, the liquid stream 152 from the high pressure separator 148 is fed to the Stripper tower 154. The liquid stream 152 comprises a portion of the $C_4$s (butylene, butane) and a major portion of the naphtha present in the hydrocarbons provided in the feed to the gas plant. The Stripper tower 154 removes a major portion of, and preferably substantially all of, the $C_3$ and lighter components from the Stripper feed stream 152 to produce a Stripper bottoms product 156 that contains a portion of the $C_4$s and a major portion of the naphtha from the gas plant feed. The Stripper 154 may be reboiled by a Main Fractionator pumparound stream, steam, or other suitable heat source. In the preferred embodiment, the Stripper 154 has a reboiler but no overhead condenser or reflux stream. The Stripper 154 may operate at a pressure of 120–275 psig, and preferably 150–220 psig, and with a bottoms temperature of 200–350 degrees F., and preferably 250–320 degrees F. The operating temperature and pressure of the Stripper 154 may be adjusted to achieve the separation of components described herein and may vary depending on the composition of the feed to the Stripper 154. The Stripper 154 operating temperatures may be 50 to 75 degrees F. above the water dew point such that water condensation problems encountered in a conventional gas plant deethanizing stripper are eliminated. The Stripper bottoms stream 156 is fed to Debutanizer tower 160. Importantly, with the new gas plant process there is no need for primary and secondary lean sponge oil absorber towers for recovery of components heavier than ethane.

The high pressure separator vapor stream 150 includes a major portion of, and preferably substantially all of, the $C_3$ and lighter components from the gas plant feed streams 46 and 52 and substantially all of said ethane, ethylene, methane, and hydrogen and may include a portion of said $C_4$s and naphtha, and may be treated in a system 162 for removal of contaminants (such as hydrogen sulfide and carbon dioxide). The system 162 used for removal of contaminants (such as hydrogen sulfide and carbon dioxide) may be similar to that used with conventional cat cracker gas plants, such as liquid amine contactors and the like. One skilled in the art will recognize that there are many systems commercially available for removal of contaminants such as $H_2S$ and $CO_2$ and that the selection of a removal system will depend on the nature and quantity of the contaminants.

After removal of contaminants such as hydrogen sulfide and carbon dioxide, the "sweet" $C_3$ and lighter stream 164 may be further compressed in a compressor 165 to a pressure adequate to facilitate further separation of the components by distillation, said pressure being approximately 350–600 psig, and preferably 400–500 psig. The compressed gases 166 may be further treated for removal of residual contaminants, such as oxygen, in a system 168 similar to that of the conventional gas plant.

The treated stream 170 is next chilled in heat exchanger(s) 172 (also referred to as "chiller(s)") to partially condense the stream 170, and the uncondensed gas 174 is separated from the condensed liquid 176 in a separator vessel (not shown on FIG. 5). One skilled in the art will recognize that hydrates of chemical components form at low temperatures. The temperature of the material exiting chiller 172 is therefore preferably above the temperature whereby hydrates would form in the process equipment and is approximately 50–65 degrees F., and preferably 52–58 degrees F.; however, one skilled in the art will recognize that the chiller 172 exit temperature may vary depending on the composition of the stream 170 to be chilled.

The hydrogen rich gas stream 174 is dried in a gas phase drier 178 that may be a fixed bed drier using an appropriate desiccant. Such desiccants are commercially available and are well known to those skilled in the art. The purpose of the drier 178 is to remove moisture that would otherwise freeze in the colder, downstream sections of the gas plant. The liquid stream 176 is also dried in a liquid phase drier 180 that may be a fixed bed drier with an appropriate desiccant. One skilled in the art will recognize that the driers may be multiple driers operated in series or parallel and may be periodically regenerated with hot gas, such as heated refinery fuel gas or other suitable regeneration medium that may be available in the particular plant. The preferred moisture content of the drier outlet streams 182 or 194 may be achieved at a dew point of approximately −150° F. However, the achievable moisture content may vary with changes in commercially available desiccants, drier regeneration frequency, desiccant replacement frequency and the like.

The dried gas stream 182 is next chilled in one or more heat exchangers ("chillers") 184. The exit temperature of the chillers 184 may range from about 0 degrees F. to minus 35 degrees F., and preferably from minus 10 degrees F. to minus 25 degrees F.; however, the exit temperature may vary depending on the composition and pressure of the stream 182 to be chilled. The temperature is selected to facilitate separation of components in the portions of the gas plant downstream from chillers 184. The dried and chilled gas stream 183 may be further cooled in a system 186 that includes heat exchangers (the details of which are not shown on FIG. 5), one or more expanders (a piece of rotating equipment known to those skilled in the art and not shown on FIG. 5), and/or a throttling valve (not shown on FIG. 5) to reduce the temperature of said stream 183. System 186 may also include vessels (not shown on FIG. 5) to separate liquids condensed in said system. All or a portion of the equipment of system 186 may be enclosed in an insulated cryogenic area referred to as a "cold box." The non-condensed gases 188 from the cold box/expander system 186 comprise methane and hydrogen and may also comprise nitrogen and a relatively small amount of ethylene. For example, the portion of the ethylene from the feed to the gas plant lost to fuel gas may be as low as 10–15 percent. The gases 188 may be used as fuel gas, drier regeneration gas, or for other purposes depending on the needs of the refinery.

A recycle stream 189 comprising predominantly methane, ethylene, ethane, propylene, and propane may be recycled to compressor 165.

The quantities of olefins recovered with the new cat cracker gas plant process are much higher in comparison to a conventional cat cracker gas plant and, correspondingly, the quantities of ethylene and propylene in the fuel gas 188 are lower with the new process described herein. In fact, in many conventional cat cracker gas plants, ethylene is not recovered and is lost to the plant fuel gas system.

Propylene refrigeration at a variety of temperature levels may be used to provide cooling in the chillers and cold box. The temperature and pressure of the propylene refrigerant may be adjusted and optimized based on operating conditions of the plant. The need for an ethylene refrigeration system found in conventional olefins separation plants is eliminated. Also, depending on the process conditions, a mixed ethylene/propylene refrigeration system may be used for process cooling.

In the preferred embodiment, the chiller 184 is of the type commonly referred to by those skilled in the art as a brazed aluminum plate fin core exchanger. The chilling medium for the chiller 184 may be propylene refrigerant or a mixed refrigerant stream (such as a propylene/ethylene mixed refrigerant system).

In the version of the new process shown on FIG. 5, the dried liquid stream 194 is fed to the Demethanizer tower 192 which separates methane and lighter components as the tower overhead stream 196 from ethylene and heavier components in the tower bottoms stream 198. A condensed liquid stream 190 from the cold box/expander system 186 may also be fed to the Demethanizer tower 192. The Demethanizer overhead stream 196 may be recycled to the cold box/expander system 186 for further processing, such as cooling to condense and recover any residual ethylene in the Demethanizer overhead stream 196. The Demethanizer bottoms stream 198 may be fed to the Deethanizer tower 200. The Demethanizer tower 192 pressure may be 350–600 psig, and preferably 400–450 psig. The Demethanizer tower 192 bottoms temperature may be 50–150 degrees F., and preferably 100–120 degrees F. The Demethanizer tower 192 temperature and pressure may be adjusted to accommodate various tower feed compositions, pressures, desired specifications, and the like.

The Demethanizer bottoms stream 198 may be treated in system(s) 199 for contaminant removal. Alternatively, the system(s) for contaminant removal may be used to process the overhead streams from the Deethanizer tower 200 or the Depropanizer tower 208. The Demethanizer bottoms stream 198 comprises a major portion of the ethylene, ethane, propylene, and propane from the gas plant feed and substantially all of the $C_4$s and naphtha from the high pressure separator gas stream 150.

The Deethanizer tower 200 separates ethane and lighter components as the overhead stream 202 from propylene and heavier components as the bottoms stream 204. The Deethanizer tower 200 pressure may be 250 psig–450 psig, and preferably 275 psig–350 psig. The Deethanizer tower 200 bottoms temperature may be 100 degrees F. to 250 degrees F., and preferably 120 degrees F. to 200 degrees F. The tower 200 temperature and pressure may be adjusted to accommodate various tower feed compositions, pressures, desired specifications, and the like. The Deethanizer overhead stream comprises a major portion of the ethylene and ethane from the gas plant feed. The Deethanizer overhead stream 202 may be separated into ethylene and ethane products in a $C_2$ Splitter tower if desired. The Deethanizer bottoms stream 204 contains a major portion of the propylene and propane from the gas plant feed, and substantially all of the $C_4$s and naphtha from the high pressure separator gas stream 150 and may be fed to the Depropanizer tower 208. The overhead condenser of the Deethanizer 200 (and other towers) may be refrigerated with propylene or other cooling source, and the Deethanizer 200 may be reboiled by Main Fractionator pumparound or steam or other appropriate heat source.

The Depropanizer tower 208 separates $C_3$s as the overhead stream 210 from the $C_4$s and heavier in the bottoms stream 212. The propylene in the overhead stream 210 may be separated from the propane in a $C_3$ Splitter distillation tower. The Depropanizer tower 208 pressure may be 250–350 psig, and preferably 250 psig–280 psig. The Depropanizer tower bottoms temperature may be 200 –300 degrees F., and preferably 225–275 degrees F. The tower 208 temperatures and pressures may be varied depending on the tower feed composition and the desired product specifications for the particular refinery. The Depropanizer may be reboiled by Main Fractionator pumparound or steam or other appropriate heat source. The Depropanizer overhead stream 210 comprises a major portion of the propylene and propane from the gas plant feed.

The Depropanizer tower bottoms stream 212 comprises substantially all of the $C_4$s and naphtha from the high pressure separator gas stream 150 and may be fed to the Debutanizer tower 160 along with the Stripper bottoms stream 156. The Debutanizer overhead stream 216 comprises a major portion of the $C_4$s from the gas plant feed and may be treated for removal of mercaptans. The Debutanizer bottoms stream 218 comprises a major portion of the naphtha from the gas plant feed and may be further treated or otherwise processed as desired. The Debutanizer tower 160 pressure may be 60–150 psig, and preferably 80–100 psig. The Debutanizer tower bottoms temperature may be 250–350 degrees F., and preferably 250–300 degrees F. The tower 160 temperatures and pressures may be varied depending on the tower feed composition and the desired product specifications. The Debutanizer 160 may be reboiled by Main Fractionator pumparound or steam or other appropriate heat source.

Figure 6A:
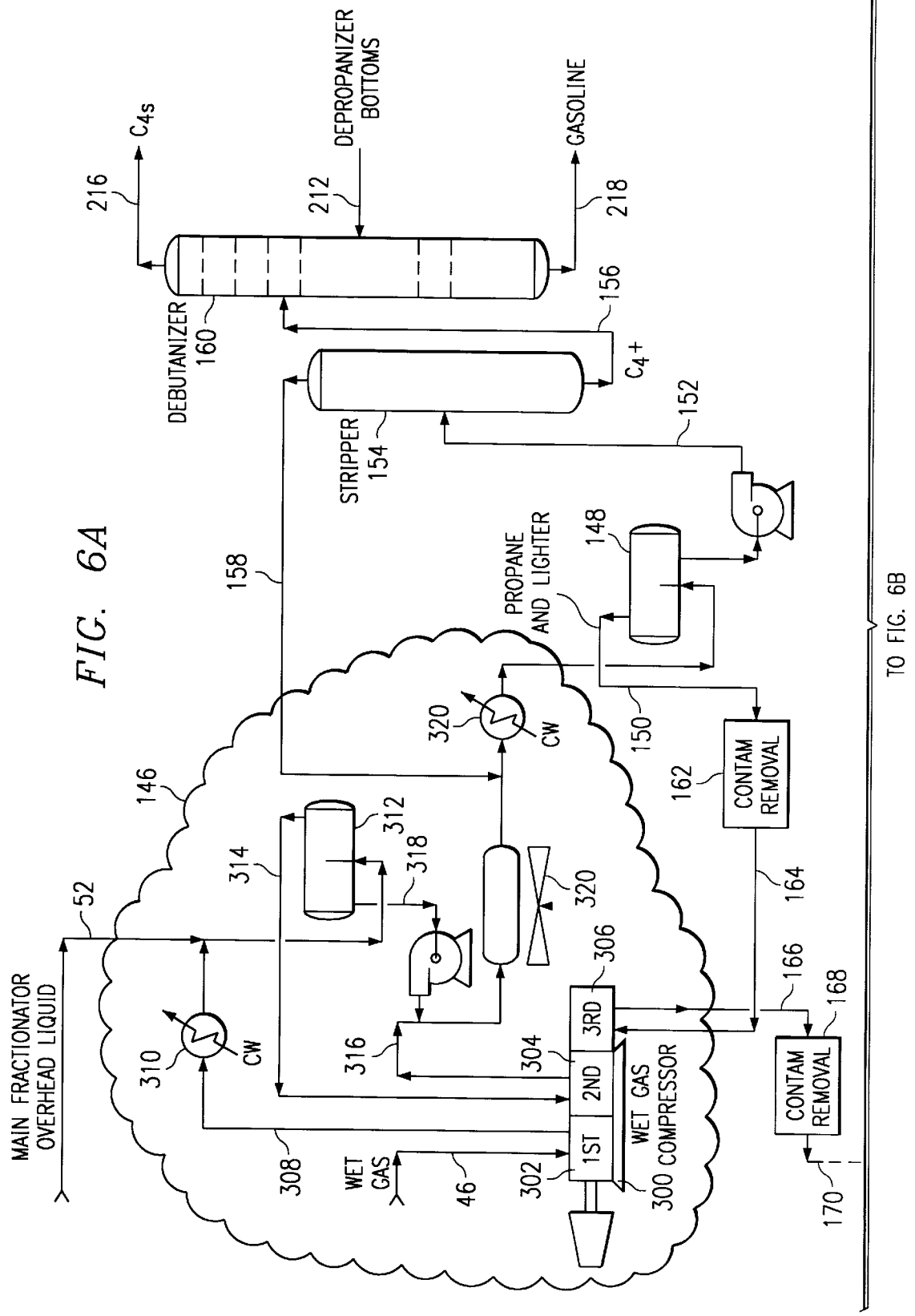
FIG. 6 illustrates details of the new gas plant process of FIG. 5.

FIG. 6 illustrates various details of an embodiment of the new process. Components of the system 146 of wet gas compressor and coolers referenced in FIG. 5 are shown on FIG. 6. Although FIG. 6 illustrates a three stage wet gas compressor 300, the number of compression stages utilized in the wet gas compressor may be varied. In the embodiment of the process shown in FIG. 6, the wet gas 46 from the Main Fractionator overhead system is compressed in the first stage 302 of the wet gas compressor 300. The first stage discharge stream 308 is cooled and partially condensed in heat exchanger(s) 310, combined with the Main Fractionator overhead liquid stream 52, and fed to a first stage separator 312 (which also serves or may be referred to as the "second stage suction drum"). The gas 314 from the first stage separator 312 may be fed to the second stage 304 of the wet gas compressor 300. The liquid 318 from the second stage suction drum 312 may be combined with the discharge stream 316 of the second stage 304 of the wet gas compressor 300. The wet gas compressor second stage discharge stream 316 and liquid 318 may be cooled in heat exchanger(s) 320, whereby the stream 316 is partially condensed, and fed to the high pressure separator 148.

The discharge pressure of the wet gas compressor 300 is adjusted to facilitate downstream separation of the ethylene and propylene included in the wet gas 46. As an illustration, in the embodiment shown in FIG. 6, the three stages of the wet gas compressor may have the conditions shown in Table 2. These operating conditions may vary depending on composition, compressor design and characteristics, and the like.

TABLE 2

| | Temperature, F. | Pressure, psig |
|---|---|---|
| First stage suction/discharge | 80/120 | 2–15/50–80 |
| Second stage suction/discharge | 80/120 | 40–70/120–300 |
| Third stage suction/discharge | 90/120 | 100–250/400–600 |

In the embodiment shown in FIG. 6, the Stripper overhead stream 158 may be combined with the wet gas compressor second stage discharge stream 316.

Referring to the details of FIG. 6, the stream 173 exiting chiller 172 is fed to separator 177 where the condensed liquid 176 is separated from the gas stream 174. The gas 174 from the separator 177 is dried in drier 178 to remove moisture. The drying operation may take place in one or more fixed bed driers that are known to those skilled in the art. The dried gas is next chilled in exchanger 184 that utilizes refrigerant to cool and partially condense the stream. Propylene refrigerant may be used. In the preferred embodiment, the exchanger 184 is a brazed aluminum plate fin exchanger.

The chilled stream 183 is next fed into a separation drum 401 wherein the liquid and vapor from stream 183 are separated into a vapor stream 402 and liquid stream 403. The liquid stream 403 from drum 401 is fed to the Demethanizer tower 192. The vapor stream 402 from drum 401 is next chilled in an exchanger 404 to further cool and partially condense stream 402. In the preferred embodiment, exchanger 404 is a brazed aluminum plate fin exchanger.

The chilled stream 405 is next fed to separator drum 406 wherein the vapor and liquid from stream 405 are separated. In the preferred embodiment, the temperature of vapor stream 407 (typically referred to as "fuel gas" or "tail gas") from drum 406 is reduced via passing the stream 407 through a system 408 that includes a throttling valve or rotating expander. The stream 409 exiting system 408 may be used as a cooling stream in exchanger 404 and yielded as a fuel gas stream 188. Fuel gas stream 188 comprises substantially all of said methane and hydrogen from said wet gas stream 46. The liquid stream 410 from drum 406 may be used as a cooling source in exchanger 404 and may be used as a recycle stream 189 returned to a point at the front end of the gas plant, such as the wet gas compressor suction. The liquid stream 410 may be depressurized before return to the suction of a stage of the wet gas compressor 300. This reduction of pressure provides a cooling or refrigeration effect for cooling the warm material in the chiller 404.

The gas stream 407 from the separator drum 406 that is reheated in the chiller 404 may be used as regeneration gas for driers or as fuel gas. The gas stream 407 from separator drum 406 contains methane, hydrogen, small quantities of ethylene, and possibly small quantities of contaminants not completely removed in upstream processing. The Demethanizer tower overhead stream 196 may be combined with the stream feeding chiller 172.

Cryogenic equipment, such as the exchanger 404 and any associated valves and drums, may be located in a thermally insulated area known by those skilled in the art as a "cold box."

In the embodiment shown in FIG. 6, the compression of the sweet $C_3$ and lighter stream 164 takes place in a stage 306 of the wet gas compressor 300. However, a separate compressor may be used to compress the stream 164. Also, the compressor stage 306 may be omitted if the stream 164 does not require additional pressure to facilitate downstream separation of the chemical components.

The ethylene recovered as ethylene product may be greater than 85 weight percent of the ethylene fed to the new gas plant process. The propylene recovered as propylene product may be greater than 98.5 weight percent of the propylene fed to the gas plant process.

As shown in FIG. 7, a portion of the new gas plant process can also be modified to eliminate the Demethanizer tower 192 (shown in FIGS. 5 and 6) for the production of a Deethanizer tower overhead stream 500 that contains a mixture of ethylene, ethane, and methane. The gas plant process shown in FIG. 7 may include the compressor stage 165 shown in FIG. 5 or may omit the compressor stage 165. The preferred embodiment includes compressor stage 165. Such an alternative configuration of the process may be desirable if the destination of the Deethanizer overhead stream 500 so warrants. For example, if only an ethylene rich stream and not an ethane liquid or polymer grade ethylene stream is desired, such an alternative configuration may be used. In this alternate configuration of the new process, the ethylene and heavier stream 190 from a cold box system 502 (which includes heat exchangers not shown) is fed directly to the Deethanizer tower 200. The Deethanizer tower 200 operates at a pressure of approximately 225–450 psig in this configuration of the process, and preferably 250–350 psig, with a bottoms temperature of approximately 120–200 degrees F. In this alternative configuration of the new gas plant, the Demethanizer tower 192 is eliminated and the liquid streams from the liquid drier 194 and the cold box 502 are fed directly to the Deethanizer tower 200. The overhead 500 from the Deethanizer is a stream rich in ethylene and ethane that also contains more methane than the Deethanizer overhead stream in the configuration with the upstream Demethanizer. The Deethanizer overhead stream 500 comprises a major portion of the methane, ethylene, and ethane from the gas plant feed. The Deethanizer bottoms stream comprises a major portion of the propylene and propane from the gas plant feed and substantially all of the $C_4$s and naphtha in the high pressure separator gas. The cold box system 502 may be generally analogous to that described in connection with FIG. 6, that is, refrigerant, throttling valve(s), and/or expanders are used to reduce the temperature and thereby separate components. In FIG. 7, the fuel gas stream comprises a major portion of the hydrogen from the gas plant feed.

Examples—Computer Simulations

The stream compositions of process of the present invention are predicted using computer simulations. Tables 3 and 4 display conditions and compositions of several of the key streams as predicted by computer simulations for an embodiment of the process configuration of FIGS. 5–6. Condensed water may be removed from the process streams via water knockout pots or drains. The water knockout drain streams are not shown in FIGS. 5–7 or in Tables 3–6. Material balance data is taken directly from simulations and may exhibit slight imbalance due to recycle convergence tolerance.

TABLE 3

| Stream Number | 46 | 52 | 150 | 152 | 156 | 158 | 174 | 176 | 188 | 189 |
|---|---|---|---|---|---|---|---|---|---|---|
| Phase | Vapor | Mixed | Vapor | Liquid | Liquid | Vapor | Vapor | Liquid | Vapor | Vapor |
| Total Weight Comp. | | | | | | | | | | |
| WATER | 5032 | 49 | 399 | 50 | 0 | 50 | 17 | 13 | 0 | 0 |
| HYDROGEN | 620 | 0 | 620 | 3 | 0 | 3 | 612 | 21 | 620 | 13 |
| NITROGEN | 1793 | 0 | 1794 | 17 | 0 | 17 | 1857 | 106 | 1794 | 169 |
| HYDROGEN SULFIDE | 41 | 0 | 41 | 8 | 0 | 8 | 0 | 0 | 0 | 0 |
| CARBON DIOXIDE | 603 | 0 | 604 | 43 | 0 | 43 | 0 | 0 | 0 | 0 |
| METHANE | 5992 | 2 | 5994 | 188 | 0 | 188 | 8411 | 1380 | 5995 | 3796 |
| ETHYLENE | 10961 | 13 | 10973 | 1140 | 0 | 1140 | 11684 | 6670 | 885 | 7381 |
| ETHANE | 5096 | 9 | 5104 | 760 | 0 | 760 | 3978 | 3266 | 122 | 2139 |
| PROPENE | 38020 | 189 | 38061 | 15174 | 147 | 15026 | 12574 | 28406 | 22 | 2919 |
| PROPANE | 6945 | 39 | 6915 | 3107 | 69 | 3038 | 2055 | 5275 | 2 | 415 |
| C4'S | 39779 | 679 | 22898 | 27904 | 17559 | 10345 | 2806 | 20264 | 0 | 172 |
| Contaminant | 68 | 0 | 68 | 2 | 0 | 2 | 0 | 0 | 0 | 0 |
| C5 plus (Naphtha) | 38948 | 28711 | 5927 | 64420 | 61732 | 2688 | 216 | 5715 | 0 | 3 |
| Total Mass Rate LB/HR | 153898 | 29691 | 99398 | 112817 | 79508 | 33309 | 44210 | 71113 | 9439 | 17008 |
| Flowrate LB-MOL/HR | 3876.2 | 267.5 | 2896.2 | 1718.3 | 987.6 | 730.7 | 1841.9 | 1681.5 | 781.4 | 665.0 |
| Temperature F | 108 | 108 | 110 | 110 | 275 | 154 | 55 | 55 | 90 | 90 |
| Pressure PSIA | 16.6 | 240.0 | 166.0 | 166.0 | 188.0 | 183.0 | 410.9 | 411.5 | 123.0 | 161.0 |

TABLE 4

| Stream Number | 196 | 198 | 202 | 204 | 210 | 212 | 216 | 218 | 314 |
|---|---|---|---|---|---|---|---|---|---|
| Phase | Mixed | Liquid | Liquid | Liquid | Liquid | Liquid | Liquid | Liquid | Vapor |
| Total Weight Comp. | | | | | | | | | |
| WATER | 0 | 0 | 0 | 0 | 0 | 0 | 0 | 0 | 1530 |
| HYDROGEN | 31 | 0 | 0 | 0 | 0 | 0 | 0 | 0 | 620 |
| NITROGEN | 191 | 0 | 0 | 0 | 0 | 0 | 0 | 0 | 1793 |
| HYDROGEN SULFIDE | 0 | 0 | 0 | 0 | 0 | 0 | 0 | 0 | 40 |
| CARBON DIOXIDE | 0 | 0 | 0 | 0 | 0 | 0 | 0 | 0 | 600 |
| METHANE | 3114 | 0 | 0 | 0 | 0 | 0 | 0 | 0 | 5979 |
| ETHYLENE | 3092 | 10088 | 10087 | 0 | 0 | 0 | 0 | 0 | 10878 |
| ETHANE | 943 | 4983 | 4981 | 2 | 2 | 0 | 0 | 0 | 5040 |
| PROPENE | 2189 | 38039 | 2 | 38038 | 37996 | 42 | 189 | 0 | 36861 |
| PROPANE | 344 | 6913 | 0 | 6913 | 6877 | 36 | 105 | 0 | 6707 |
| C4'S | 373 | 22898 | 0 | 22898 | 39 | 22859 | 39085 | 1333 | 36068 |
| Contaminant | 0 | 0 | 0 | 0 | 0 | 0 | 0 | 0 | 68 |
| C5 plus (Naphtha) | 25 | 5927 | 0 | 5927 | 0 | 5927 | 247 | 67412 | 21778 |
| Total Mass Rate LB/HR | 10302 | 88848 | 15071 | 73779 | 44915 | 28864 | 39627 | 68745 | 127962 |
| Flowrate LB-MOL/HR | 424.7 | 2075.4 | 525.3 | 1550.1 | 1059.6 | 490.5 | 699.4 | 778.7 | 3371.0 |
| Temperature F | 33 | 119 | −16 | 147 | 113 | 235 | 118 | 271 | 110 |
| Pressure PSIA | 400.0 | 404.0 | 270.0 | 285.7 | 265.0 | 280.0 | 80.0 | 92.0 | 50.3 |

An alternative process of the present invention is also evaluated using computer simulations. Tables 5 and 6 display conditions and compositions of several of the key streams predicted by a computer simulation for an embodiment of the process configuration of FIG. 7. The stream numbers for Tables 5 and 6 correspond to the streams shown in FIGS. 5 and 6 but with the process configuration of FIG. 7 (no demethanizer tower).

TABLE 5

| Stream Number | 46 | 52 | 150 | 152 | 156 | 158 | 174 | 176 | 188 | 189 |
|---|---|---|---|---|---|---|---|---|---|---|
| Phase | Vapor | Mixed | Vapor | Liquid | Liquid | Vapor | Vapor | Liquid | Vapor | Vapor |
| Total Weight Comp. | | | | | | | | | | |
| WATER | 5032 | 49 | 399 | 50 | 0 | 50 | 15 | 13 | 0 | 0 |
| HYDROGEN | 620 | 0 | 620 | 3 | 0 | 3 | 606 | 23 | 589 | 9 |
| NITROGEN | 1793 | 0 | 1794 | 17 | 0 | 17 | 1797 | 118 | 1624 | 121 |
| HYDROGEN SULFIDE | 41 | 0 | 41 | 8 | 0 | 8 | 0 | 0 | 0 | 0 |
| CARBON DIOXIDE | 603 | 0 | 604 | 43 | 0 | 43 | 0 | 0 | 0 | 0 |
| METHANE | 5992 | 2 | 5994 | 188 | 0 | 188 | 6836 | 1296 | 4011 | 2138 |
| ETHYLENE | 10961 | 13 | 10973 | 1140 | 0 | 1140 | 9896 | 6563 | 721 | 5484 |
| ETHANE | 5096 | 9 | 5104 | 760 | 0 | 760 | 3471 | 3315 | 105 | 1681 |
| PROPENE | 38020 | 189 | 38055 | 15171 | 147 | 15024 | 11117 | 29337 | 18 | 2399 |
| PROPANE | 6945 | 39 | 6915 | 3107 | 69 | 3037 | 1815 | 5442 | 2 | 342 |
| C4'S | 39779 | 679 | 22896 | 27901 | 17558 | 10343 | 2431 | 20604 | 0 | 140 |
| Contaminant | 68 | 0 | 68 | 2 | 0 | 2 | 0 | 0 | 0 | 0 |
| C5 plus (Naphtha) | 38948 | 28711 | 5927 | 64419 | 61731 | 2688 | 184 | 5746 | 0 | 3 |
| Total Mass Rate LB/HR | 153898 | 29691 | 99389 | 112810 | 79506 | 33304 | 38167 | 72457 | 7069 | 12315 |
| Flow rate LB-MOL/HR | 3876.2 | 267.5 | 2896.0 | 1718.1 | 987.5 | 730.6 | 1610.6 | 1708.3 | 629.6 | 460.7 |
| Temperature F | 108 | 108 | 110 | 110 | 275 | 154 | 55 | 55 | 90 | 90 |
| Pressure PSIA | 16.6 | 240.0 | 166.0 | 166.0 | 188.0 | 183.0 | 410.9 | 411.5 | 143.0 | 161.0 |

TABLE 6

| Stream Number | 500 | 204 | 210 | 212 | 216 | 218 | 314 |
|---|---|---|---|---|---|---|---|
| Phase | Vapor | Liquid | Liquid | Liquid | Liquid | Liquid | Vapor |
| Total Weight Comp. | | | | | | | |
| WATER | 0 | 0 | 0 | 0 | 0 | 0 | 1530 |
| HYDROGEN | 31 | 0 | 0 | 0 | 0 | 0 | 620 |
| NITROGEN | 170 | 0 | 0 | 0 | 0 | 0 | 1793 |
| HYDROGEN SULFIDE | 0 | 0 | 0 | 0 | 0 | 0 | 40 |
| CARBON DIOXIDE | 0 | 0 | 0 | 0 | 0 | 0 | 600 |
| METHANE | 1984 | 0 | 0 | 0 | 0 | 5979 | |
| ETHYLENE | 10256 | 0 | 0 | 0 | 0 | 0 | 10878 |
| ETHANE | 4998 | 2 | 2 | 0 | 0 | 0 | 5040 |
| PROPENE | 3 | 38035 | 37993 | 42 | 189 | 0 | 36861 |
| PROPANE | 0 | 6913 | 6877 | 36 | 106 | 0 | 6707 |
| C4'S | 0 | 22895 | 39 | 22856 | 39081 | 1333 | 36068 |
| Contaminant | 0 | 0 | 0 | 0 | 0 | 0 | 68 |
| C5 plus (Naphtha) | 0 | 5927 | 0 | 5927 | 24767 | 411 | 21777 |
| Total Mass Rate LB/HR | 17442 | 73772 | 44911 | 28862 | 39624 | 68744 | 127962 |
| Flowrate LB-MOL/HR | 677.5 | 1550.0 | 1059.5 | 490.5 | 699.3 | 778.7 | 3371.0 |
| Temperature F | −20 | 163 | 113 | 235 | 118 | 271 | 110 |
| Pressure PSIA | 320.0 | 335.7 | 265.0 | 280.0 | 80.0 | 92.0 | 50.3 |

What is claimed is:

1. A process for recovering olefins from hydrocarbons produced in a fluid catalytic cracking unit, the process comprising:

a. providing hydrocarbons produced in a fluid catalytic cracking unit, said hydrocarbons comprising ethylene, ethane, propylene, propane, butane, butylene, and $C_5$ and heavier components;

b. pressurizing said hydrocarbons to a pressure in the range of approximately 120 psig to 300 psig;

c. cooling said pressurized hydrocarbons;

d. feeding said cooled, pressurized hydrocarbons to a separator operated at a temperature in the range of approximately 80 degrees F. to 120 degrees F. and a pressure in the range of approximately 120 psig to 270 psig;

e. yielding from said separator a gas stream comprising a major portion of the propane and lighter components of said hydrocarbons and substantially all of the ethylene in said hydrocarbons;

f. separating hydrogen and methane from said gas stream, thereby forming an ethylene and heavier stream;

g. separating ethane and lighter components from said ethylene and heavier stream, thereby forming an ethane and lighter stream and a propylene and heavier stream;

h. yielding from said separator a liquid stream that comprises a portion of said propylene, propane and heavier components of said hydrocarbons;

i. feeding said liquid stream from said separator to a stripper tower;

j. operating said stripper tower to remove as a stripper overhead stream a major portion of the propane and lighter components from said liquid stream fed to said stripper tower;

k. feeding said stripper overhead stream into the hydrocarbons entering said separator; and l. yielding from said stripper tower bottom a de-propanized liquid stream.

2. The process of claim 1, wherein said stripper tower is operated to remove as a stripper overhead stream substantially all of the propane and lighter components from said liquid stream fed to said stripper tower.

3. The process of claim 1, wherein said stripper tower is operated at a temperature in the range of approximately 50 degrees F. to 75 degrees F. above the water dew point.

4. The process of claim 1, wherein said stripper tower is operated at a pressure in the range of approximately 120 psig to 275 psig and with a bottoms temperature in the range of approximately 200 degrees F. to 350 degrees F.

5. The process of claim 1, wherein said stripper tower is operated at a pressure in the range of approximately 150 psig to 220 psig and with a bottoms temperature in the range of approximately 250 degrees F. to 320 degrees F.

6. The process of claim 1, wherein said stripper tower is operated with no external reflux stream at the top of the tower.

7. The process of claim 1, further comprising:

m. feeding said de-propanized liquid stream to a debutanizer tower;

n. operating said debutanizer tower at a bottoms temperature in the range of approximately 250 degrees F. to 350 degrees F. and a pressure in the range of approximately 60 psig to 150 psig;

o. yielding from said debutanizer tower an overhead stream comprising butane and butylene; and p. yielding from said debutanizer tower a bottoms stream comprising $C_5$ and heavier components.

8. A process for recovering olefins from hydrocarbons produced in a fluid catalytic cracking unit, the process comprising:

a. providing a fluid catalytic cracking reactor effluent stream to a Main Fractionator distillation tower, said reactor effluent stream comprising hydrogen, methane, ethylene, ethane, propylene, propane, butylene, butane, and $C_5$ and heavier components;

b. operating said Main Fractionator tower to produce therefrom (i) a wet gas stream comprising hydrogen, methane, ethylene, ethane, propylene, propane, butylene, and butane, and (ii) a Main Fractionator overhead liquid stream comprising predominantly $C_5$ and heavier components;

c. pressurizing the chemical components of said wet gas stream to a pressure in the range of approximately 120–300 psig;

d. pressuring the chemical components of said Main Fractionator overhead liquid stream to a pressure in the range of approximately 120–300 psig;

e. cooling the chemical components of said wet gas stream to a temperature in the range of approximately 80–120 degrees F.;

f. cooling the chemical components of said Main Fractionator overhead liquid stream to a temperature in the range of approximately 80–120 degrees F.;

g. feeding the chemical components of said wet gas stream and said Main Fractionator overhead liquid steam to a separator vessel operated at a pressure of approximately 120–270 psig;

h. yielding from said separator vessel (i) a first stream comprising a major portion of said propylene and propane from said reactor effluent and substantially all of said ethane, ethylene, methane, and hydrogen from said reactor effluent, and (ii) a second stream comprising $C_5$ and heavier compounds; and wherein the second stream further comprises a portion of the propylene and propane from said reactor effluent;

i. feeding said second stream from said separator vessel to a stripper tower;

j. operating said stripper tower to remove as a stripper overhead stream a major portion of the propane and propylene from said second stream fed to said stripper tower;

k. feeding said stripper overhead stream into the hydrocarbons entering said separator vessel; and l. yielding from said stripper tower bottom a de-propanized liquid stream.

9. The process of claim 8, wherein said first stream yielded from said separator comprises substantially all of said propylene and said propane from said reactor effluent.

10. A process for recovering olefins from hydrocarbons produced in a fluid catalytic cracking unit, the process comprising:

a. providing a fluid catalytic cracking reactor effluent stream to a Main Fractionator distillation tower, said reactor effluent stream comprising hydrogen, methane, ethylene, ethane, propylene, propane, butylene, butane, and $C_5$ and heavier components;

b. operating said Main Fractionator tower to produce, therefrom (i) a wet gas stream comprising hydrogen, methane, ethylene, ethane, propylene, propane, butylene, and butane, and (ii) a Main Fractionator overhead liquid stream comprising predominantly $C_5$ and heavier components;

c. pressurizing the chemical components of said wet gas stream to pressure in the range of approximately 120–300 psig;

d. pressuring the chemical components of said Main Fractionator overhead liquid stream to pressure in the range of approximately 120–300 psig;

e. cooling the chemical components of said wet gas stream to a temperature in the range of approximately 80–120 degrees F.;

f. cooling the chemical components of said Main Fractionator overhead liquid stream to a temperature in the range of approximately 80–120 degrees F.;

g. feeding the chemical components of said wet gas stream and said Main Fractionator overhead liquid steam to a separator vessel operated at a pressure of approximately 120–270 psig;

h. yielding from said separator vessel (i) a first stream comprising a major portion of said propylene and propane from said reactor effluent and substantially all of said ethane, ethylene, methane, and hydrogen from said reactor effluent, and (ii) a second stream comprising propane and heavier compounds;

i. processing said first stream from said separator to separate therefrom substantially all of said methane and hydrogen thereby producing an ethylene and heavier stream comprising a major portion of said ethylene, ethane, propylene and propane from said reactor effluent stream;

j. feeding said ethylene and heavier stream to a deethanizer tower;

k. producing from said deethanizer tower a deethanizer overhead stream comprising a major portion of said ethylene and ethane from said reactor effluent stream and a deethanizer bottoms stream comprising a major portion of said propylene and propane from said reactor effluent stream;

l. feeding said deethanizer bottoms stream to a depropanizer tower;

m. producing from said depropanizer tower a depropanizer overhead stream comprising propylene and propane and a depropanizer bottoms stream comprising butylene and heavier components;

n. feeding said second stream from said separator vessel to a stripper tower;

o. operating said stripper tower to remove as a stripper overhead stream a major portion of the propane from said second stream fed to said stripper tower;

p. feeding said stripper overhead stream into the hydrocarbons entering said separator vessel; and q. yielding from said stripper tower bottom a de-propanized liquid stream.

11. A process for recovering olefins from a mixture of hydrocarbons from a fluid catalytic cracking unit comprising the steps of:

a. providing a fluid catalytic cracking reactor effluent stream to a Main Fractionator distillation tower, said reactor effluent stream comprising hydrogen, methane, ethylene, ethane, propylene, propane, butylene, butane, naptha, and water;

b. operating said Main Fractionator to produce (i) a wet gas stream comprising hydrogen, methane, ethylene, propylene, propane, butylene, butane, naptha, and water, and (ii) a Main Fractionator overhead liquid stream including predominantly naptha;

c. feeding said wet gas stream and said Main Fractionator overhead liquid stream to a separator vessel operated at a pressure of 120–270 psig and a temperature in the range of 80–120 degrees F.;

d. yielding from said separator vessel (i) a first stream containing a major portion of said propane and propylene and substantially all of said ethane, ethylene, methane, and hydrogen and a portion of said water, and (ii) a second stream comprising butylene and heavier components;

e. removing water from said first stream;

f. chilling said first stream, thereby condensing a portion thereof and forming a liquid hydrogen-lean stream and a gaseous hydrogen-rich stream;

g. feeding said liquid hydrogen-lean stream to a Deethanizer tower;

h. operating said Deethanizer tower at a pressure of approximately 225–450 psig and a bottoms temperature of approximately 120–200 degrees F.;

i. producing from said Deethanizer tower (i) a Deethanizer tower overhead stream comprising a major portion of the methane, ethylene, and ethane from said wet gas and Main Fractionator overhead liquid streams, and (ii) a Deethanizer bottoms stream comprising a major portion of the propane and propylene from the wet gas and Main Fractionator overhead liquid streams;

j. stripping propane and propylene from said second stream from said separator vessel to form a stripped butylene and heavier stream; and k. recycling the propane and propylene stripped from said second stream such that said stripped propane and propylene are processed in said separator.

12. The process of claim 10, wherein the amount of ethylene recovered in said $C_2$ minus stream is greater than 85 percent of the ethylene in said hydrocarbons.

13. The process of claim 10, wherein the amount of propylene recovered in said Depropanizer overhead stream is greater than 98.5 percent of the propylene in said reactor effluent stream.

14. The process of claim 8 or 11, wherein said fluid catalytic cracking unit is a Deep Catalytic Cracking Unit and the reactor effluent stream to the Main Fractionator tower comprises at least 14–21 weight percent propylene and at least 2–6 weight percent ethylene.

15. The process of claim 8 or 11, wherein said fluid catalytic cracking unit is a Deep Catalytic Cracking Unit and the reactor effluent stream to the Main Fractionator tower comprises at least 11–25 weight percent propylene and at least 2–6 weight percent ethylene.

* * * * *